US012698154B2

(12) United States Patent
Hon

(10) Patent No.: US 12,698,154 B2
(45) Date of Patent: Aug. 4, 2026

(54) EASY OPEN CONTAINER

(71) Applicant: Sam Hon, Las Vegas, NV (US)

(72) Inventor: Sam Hon, Las Vegas, NV (US)

( * ) Notice: Subject to any disclaimer, the term of this patent is extended or adjusted under 35 U.S.C. 154(b) by 0 days.

(21) Appl. No.: 18/957,479

(22) Filed: Nov. 22, 2024

(65) Prior Publication Data

US 2025/0083894 A1 Mar. 13, 2025

Related U.S. Application Data

(63) Continuation of application No. 18/304,288, filed on Apr. 20, 2023, now Pat. No. 12,179,998, which is a (Continued)

(51) Int. Cl.
*B65F 1/06* (2006.01)
*B65D 43/26* (2006.01)
(Continued)

(52) U.S. Cl.
CPC ............ *B65F 1/068* (2013.01); *B65D 43/262* (2013.01); *B65D 45/16* (2013.01); *B65F 1/163* (2013.01); *B65F 1/1646* (2013.01); *B65F 1/002* (2013.01); *B65F 1/1468* (2013.01); *B65F 1/1473* (2013.01); *B65F 1/1615* (2013.01); *B65F 1/1623* (2013.01);
(Continued)

(58) Field of Classification Search
CPC .. B65F 1/068; B65F 1/06; B65F 1/163; B65F 1/1623; B65F 1/16; B65F 1/1646; B65F 1/002; B65F 1/1615; B65F 1/1638; B65F 2001/1669; B65F 2210/148; B65F 2220/101; B65D 43/262; B65D 43/26; B65D 43/164; B65D 43/16; B65D 45/22; B65D 45/16; B65D 15/24; B65D 7/34
USPC ......... 220/4.01, 264, 263, 262, 260, 495.08, 220/495.06, 908.1, 908, 326, 324, 810, 220/827, 692; D34/10, 9, 8, 7; 206/1.5
See application file for complete search history.

(56) References Cited

U.S. PATENT DOCUMENTS 1,381,390 A 6/1921 Zifferer
2,862,683 A 12/1958 Dunagan et al.
(Continued)

FOREIGN PATENT DOCUMENTS

GB 2294499 A 5/1996

OTHER PUBLICATIONS

"U.S. Appl. No. 15/265,475, Examiner Interview Summary dated Aug. 4, 2017", 3 pgs.
(Continued)

*Primary Examiner* — Robert J Hicks
(74) *Attorney, Agent, or Firm* — Kwan & Olynick LLP

(57) ABSTRACT

A container is provided. The container comprises a cover, a base, and a body, which includes one or more spine structures and one or more door panels which may open and allow substantially lateral access to the interior of the container. The one or more door panels may be secured in a closed position by a latch mechanism. In a first mode, the latch mechanism is not released. In a second mode, the latch mechanism is released. The first mode and the second mode may operate concurrently and can be accessed separately via different mechanisms. A switch mechanism may alternate between the first mode and the second mode. Alternatively, a pedal includes a first pedal mechanism corresponding to the first mode and a second pedal mechanism corresponding to the second mode.

20 Claims, 16 Drawing Sheets

Related U.S. Application Data continuation of application No. 17/533,076, filed on Nov. 22, 2021, now Pat. No. 11,661,272, which is a continuation of application No. 16/425,820, filed on May 29, 2019, now Pat. No. 11,208,261, which is a continuation of application No. 15/803,674, filed on Nov. 3, 2017, now Pat. No. 10,343,843, which is a continuation of application No. 15/265,475, filed on Sep. 14, 2016, now Pat. No. 9,944,460.

(60) Provisional application No. 62/220,810, filed on Sep. 18, 2015.

(51) Int. Cl.

| | |
|---|---|
| ***B65D 45/16*** | (2006.01) |
| ***B65F 1/16*** | (2006.01) |
| *B65F 1/00* | (2006.01) |
| *B65F 1/14* | (2006.01) |

(52) U.S. Cl.

CPC . *B65F 2001/1669* (2013.01); *B65F 2210/148* (2013.01); *B65F 2220/101* (2013.01)

(56) References Cited

U.S. PATENT DOCUMENTS

| | | | |
|---|---|---|---|
| 4,218,103 | A | 8/1980 | Bacskay |
| 4,923,080 | A | 5/1990 | Lounsbury |
| 4,955,497 | A | 9/1990 | Winden et al. |
| 6,179,151 | B1 | 1/2001 | Radvansky et al. |
| 6,234,339 | B1 | 5/2001 | Thomas |
| 8,266,871 | B1 | 9/2012 | Stravitz |
| 9,944,460 | B2 | 4/2018 | Hon |
| 10,343,843 | B2 | 7/2019 | Hon |
| 11,208,261 | B2 | 12/2021 | Hon |
| 11,661,272 | B2 | 5/2023 | Hon |
| 2005/0106706 | A1 | 5/2005 | Chomik et al. |
| 2005/0224496 | A1 | 10/2005 | Moyer |
| 2006/0255033 | A1 | 11/2006 | Yang et al. |
| 2009/0071939 | A1 | 3/2009 | Komvopoulos et al. |
| 2012/0037637 | A1 | 2/2012 | Beyda et al. |
| 2013/0032597 | A1 | 2/2013 | Anderson |
| 2014/0209605 | A1 | 7/2014 | Spahmann et al. |
| 2014/0353315 | A1 | 12/2014 | Prosa |
| 2015/0274417 | A1 | 10/2015 | Feanny |
| 2015/0368041 | A1 | 12/2015 | Coffin |
| 2016/0185525 | A1 | 6/2016 | Mashburn et al. |
| 2016/0200508 | A1 | 7/2016 | Thoma et al. |
| 2017/0081117 | A1 | 3/2017 | Hon et al. |
| 2018/0057256 | A1 | 3/2018 | Hon |
| 2019/0276231 | A1 | 9/2019 | Hon |
| 2022/0081204 | A1 | 3/2022 | Hon |
| 2023/0249905 | A1 | 8/2023 | Hon |

OTHER PUBLICATIONS

"U.S. Appl. No. 15/265,475, Non Final Office Action dated Jul. 31, 2017", 11 pgs.

U.S. Appl. No. 16/425,820, Non-Final Rejection, Sep. 30, 2020, 6 pgs.

U.S. Appl. No. 17/533,076, USPTO e-Office Action: NOA—Notice Of Allowance And Fees Due (Ptol-85), Jan. 20, 2023, 7 pages.

U.S. Appl. No. 18/304,288, USPTO e-Office Action: CTNF—Non-Final Rejection, Apr. 1, 2024, 7 pages.

U.S. Appl. No. 18/304,288, USPTO e-Office Action: NOA—Notice Of Allowance And Fees Due (Ptol-85), Aug. 27, 2024, 7 pages.

U.S. Appl. No. 15/265,475, Examiner Interview Summary mailed Aug. 4, 2017, 3 pgs.

U.S. Appl. No. 15/265,475, Examiner Interview Summary mailed Nov. 29, 2017, 3 pgs.

U.S. Appl. No. 15/265,475, Non Final Office Action mailed Jul. 31, 2017, 11 pgs.

U.S. Appl. No. 15/265,475, Non Final Office Action mailed Nov. 21, 2017. 7 pgs.

U.S. Appl. No. 15/265,475, Notice of Allowance mailed Dec. 12, 2017, 9 pgs.

U.S. Appl. No. 15/803,674, Final Office Action mailed Nov. 13, 2018, 9 pgs.

U.S. Appl. No. 15/803,674, Non Final Office Action mailed Dec. 13, 2017, 6 pgs.

U.S. Appl. No. 15/803,674, Notice of Allowance mailed Feb. 28, 2019, 8 pgs.

U.S. Appl. No. 16/425,820, Notice of Allowance mailed Aug. 19, 2021, 8 pgs.

EASY OPEN CONTAINER

CROSS-REFERENCE TO RELATED APPLICATIONS

This application is a continuation of U.S. application Ser. No. 18/304,288, filed Aril 20, 2023, titled "EASY OPEN CONTAINER" by Sam Hon, which is a continuation of U.S. application Ser. No. 17/533,076, filed Nov. 22, 2021, titled "EASY OPEN CONTAINER" by Sam Hon, which is a continuation of U.S. application Ser. No. 16/425,820, filed May 29, 2019, titled "EASY OPEN CONTAINER" by Sam Hon, which is a continuation of U.S. application Ser. No. 15/803,674, filed Nov. 3, 2017, titled "EASY OPEN CONTAINER" by Sam Hon, which is a continuation of U.S. application Ser. No. 15/265,475, filed Sep. 14, 2016, titled "EASY OPEN CONTAINER" by Sam Hon, which claims the benefit of prior application U.S. Provisional Application No. 62/220,810, filed Sep. 18, 2015, titled "EASY OPEN CONTAINER" by Sam Hon, all of which are herein incorporated by reference in their entirety for all purposes

TECHNICAL FIELD

The present disclosure relates generally to storage containers, and more specifically to containers for storage and disposal of waste.

DESCRIPTION OF RELATED ART

The trash can, or garbage can, is a familiar and necessary item in almost every household. The role of the trash can is to work in tandem with a garbage bag to provide a temporary receptacle for trash/garbage. A typical trash can is lined with a garbage bag, which prevents garbage from staining or otherwise soiling the trash can. Because the trash can is only a temporary retainer for garbage, once the garbage bag is full, the garbage bag needs to be removed.

With many trash cans, a full garbage bag is removed by pulling up on the bag and lifting the bag out of the trash can in a substantially vertical motion through an opening at the top of the trash can. One of the main problems of having to lift a full garbage bag vertically is that the weight of the contents stored in the bag can make it difficult to lift the bag out of the top opening. Another problem occurs when the contents within a full garbage bag push outward horizontally causing friction and a vacuum seal, creating a suction force, between the garbage bag and the trash can, both of which may act as opposing forces to the force applied by a user when attempting to remove the garbage bag. Thus, gravity, friction, and suction forces can make it difficult to pull out a full garbage bag. In some cases, trying to remove the garbage bag while fighting these opposing forces can lead to injury to the user or cause the garbage bag to rip, creating a mess and causing frustration.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide a container including a cover, a base, and a body. The body includes one or more spine structures coupled to the cover and the base. The body further includes one or more door panels coupled to one or more of the following: the cover, the base, and the one or more spine structures. The one or more door panels may open and allow substantially lateral access to the interior of the container. The cover may be coupled to the one or more spine structures by a hinge mechanism. The one or more door panels may be coupled by hinge mechanisms to one or more of the following: the cover, the base, and the one or more spine structures.

The one or more door panels may be secured in a closed position by a latch mechanism. The container comprises a first mode and a second mode. In the first mode, the latch mechanism is not released. In the second mode, the latch mechanism is released. The first mode and the second mode may operate concurrently and can be accessed separately via different mechanisms.

The container may further comprise a pedal including a first pedal mechanism and a second pedal mechanism. Activation of the first pedal mechanism causes the container to operate in the first mode and activation of the second pedal mechanism causes the container to operate in the second mode.

In other embodiments, the cover may also be secured in a closed position by the latch mechanism. The cover may include an opening for insertion of material. The cover may further comprise a lid that covers the opening. The lid may be mechanically opened via one or more rods that are activated by a pedal.

The container may further comprise a switch mechanism to alternate between the first mode and the second mode. The latch mechanism may comprise a door rod coupled to a first door panel in a vertical orientation. The door rod may move upward and downward on a vertical axis. The latch mechanism may further comprise one or more door hooks coupled to the door rod, and one or more door pins coupled to a second door panel. The one or more door hooks may attach to the one or more corresponding door pins to secure the first door panel and the second door panel in a closed position. The latch mechanism may further comprise a cover hook coupled to the first door panel, which attaches to a cover pin of the cover to secure the upper cover in a closed position.

The container may further comprise a pedal coupled to the base, a floor rod coupled to the pedal, a connector pin coupled to the pedal, and a vertical pin coupled to the switch mechanism. The vertical pin moves upward and downward on a vertical axis. In the first mode, activation of the pedal causes the floor rod to mechanically open the lid. In the second mode, activation of the pedal causes the connector pin to engage the vertical pin in an upward vertical motion to engage the door rod in an upward vertical motion to cause: (1) the one or more door hooks to detach from the one or more corresponding door pins to allow the first door panel and the second door panel to open; and (2) the cover hook to detach from the cover pin to allow the upper cover to open.

In another aspect, which may include at least a portion of the subject matter of any of the preceding and/or following examples and aspects, a method for operating a container is provided. The method comprises alternating between a first mode and a second mode in the container that comprises a cover, a base, and a body including one or more spine structures and one or more door panels.

In the first mode a user may access a first mechanism to open a lid of the cover to access an opening to insert material. In the second mode the user may access a second mechanism to open the one or more door panels, wherein the opening of one or more door panels provides substantially lateral access to the interior of the container.

The first mode and the second mode may operate concurrently and can be accessed separately via different mechanisms. In one aspect, the container further comprises a pedal including a first pedal mechanism and a second pedal mechanism, wherein the first pedal mechanism corresponds to the first mechanism and the second pedal mechanism corresponds to the second mechanism.

In another aspect, alternating between the first mode and the second mode includes activating a switch mechanism. The cover and the one or more door panels are secured in a closed position by a latch mechanism. The latch mechanism may comprise a door rod coupled to a first door panel in a vertical orientation. The door rod may move upward and downward on a vertical axis. The latch mechanism may further comprise one or more door hooks coupled to the door rod and one or more door pins coupled to a second door panel. The one or more door hooks attaches to the one or more corresponding door pins to secure the first door panel and the second door panel in a closed position. The latch mechanism may further comprise a cover hook coupled to the first door panel. The cover hook attaches to a cover pin of the cover to secure the upper cover in a closed position.

The container may further comprise a pedal coupled to the base, a floor rod coupled to the pedal, a connector pin coupled to the pedal, and a vertical pin coupled to the switch mechanism. The vertical pin moves upward and downward on a vertical axis. In the first mode, activation of the pedal causes the floor rod to mechanically open the lid. In the second mode, activation of the pedal causes the connector pin to engage the vertical pin in an upward vertical motion to engage the door rod in an upward vertical motion to cause: (1) the one or more door hooks to detach from the one or more corresponding door pins to allow the first door panel and the second door panel to open; and (2) the cover hook to detach from the cover pin to allow the upper cover to open.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
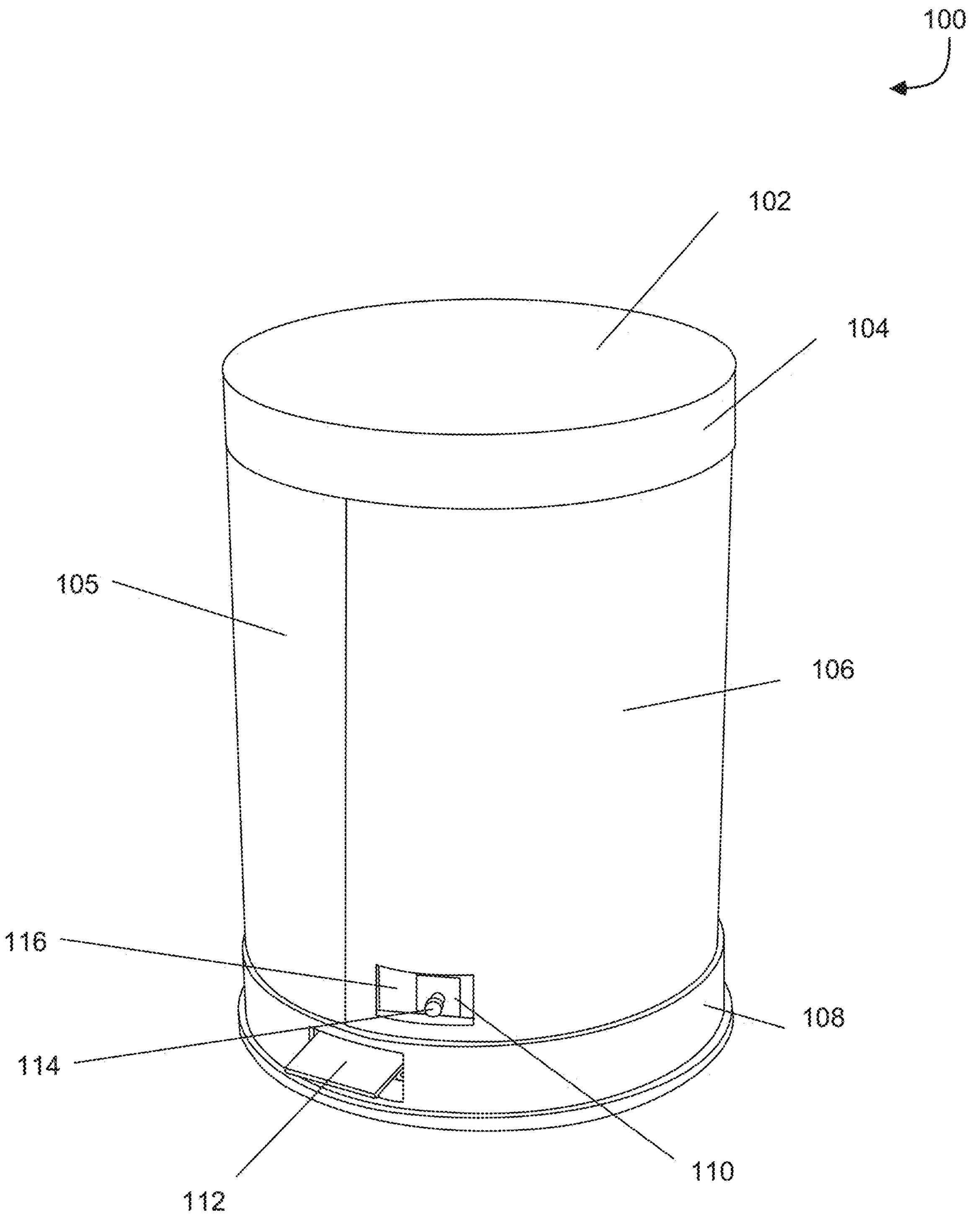
FIG. 1 depicts an example of a container in a closed position, in accordance with one or more embodiments.

Reference will now be made in detail to some specific examples of the invention including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the structure and mechanisms of the present invention will be described in the context of particular materials. However, it should be noted that the structure and mechanisms of the present invention may consists of a variety of different materials. In the following description, numerous specific details are set forth in order to provide a thorough understanding of the present invention. Particular example embodiments of the present invention may be implemented without some or all of these specific details. In other instances, well known structures, mechanisms, and materials have not been described in detail in order not to unnecessarily obscure the present invention.

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term “if” may be construed to mean “when” or “upon” or “in response to determining” or “in accordance with a determination” or “in response to detecting,” that a stated condition precedent is true, depending on the context. Similarly, the phrase “if it is determined [that a stated condition precedent is true]” or “if [a stated condition precedent is true]” or “when [a stated condition precedent is true]” may be construed to mean “upon determining” or “in response to determining” or “in accordance with a determination” or “upon detecting” or “in response to detecting” that the stated condition precedent is true, depending on the context.

As used herein, the terms “garbage” and “trash” are used interchangeably. Also as used herein, the terms “can,” (noun) “receptacle,” and “bin” are all used interchangeably. As used herein, movement, motion, direction, or access refer to movement along a horizontal axis and a vertical axis, wherein the horizontal axis is parallel to the ground and vertical axis is perpendicular to the ground. As used herein, movement, motion, direction, or access in a “substantially horizontal” or “substantially lateral” direction refers to movement, motion, direction, or access where the horizontal component is greater or equal to the vertical component. As used herein, movement, motion, direction, or access in a “substantially vertical” direction refers to movement, motion, direction, or access where the vertical component is greater or equal to the horizontal component. In cases where both components are the same, either term could refer to the movement.

As used herein, “fully opening” a container refers to all the door panels and/or cover of a container to open, thereby releasing the garbage bag and/or exposing the garbage bag for removal. As used herein, the term “full open mode” can refer to a state in which the container is capable of fully opening via a subsequent action by a user. For example, if a container has switched into a fully open mode, then a subsequent stepping of a pedal, which would normally only open a lid on the cover, causes the container to fully open. As used herein, the term “regular mode” refers to a mode in which a user action, such as stepping on the pedal, just causes the lid on the container to open.

Various techniques and mechanisms of the present invention will sometimes be described in singular form for clarity. However, it should be noted that some embodiments include multiple iterations of a structure or multiple instantiations of a mechanism unless noted otherwise. For example, a system uses a processor in a variety of contexts where mechanisms are controlled automatically, electronically, or wirelessly. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

According to various embodiments, a container is provided including an upper cover, and lower base, and a body that can open to allow substantially lateral access to the interior of the container and effortless removal of its contents. In some embodiments, the body includes one or more non-moving spine structures and one or more door panels that can open to allow substantially lateral access to the interior of the container. According to certain embodiments, the one or more door panels are coupled to one or more of the following: the upper cover, the lower base, or the one or more spine structures.

Example Embodiments

According to various embodiments, the container includes an upper cover, a lower base, and a body. The body consists of one or more spine structure connecting the upper cover and the lower base. The body further consists of one or more door panels that can open and provide substantially lateral access to the interior of the container. In some embodiments, the upper cover, the lower base, and body can be made of materials or a combination of materials such as polypropylene, polyethylene, polyurethane, thermoplastic rubber, bamboo, recycled plastic, metal, or any other material or combination of materials that provides the desired strength, flexibility, durability, weight, water resistance, or other desired physical characteristic.

According to various embodiments, the upper cover may include an opening for insertion of any material, such as garbage. In other embodiments the opening in the upper cover may be covered by a lid that can open and close. In some embodiments, the lid may either entirely cover the opening or partially cover the opening. In some embodiments, the lid may be separate or coupled to the upper cover. In some embodiments, the lid is opened and closed mechanically, such as by mechanisms involving pedals, levers, rods, etc. In some embodiments, the upper cover may be attached to the spine structure by a hinge mechanism so that it will open and close. In some embodiments, the upper cover may be secured in a closed position by a locking mechanism, such as a hook. In some embodiments, the upper cover may be opened and closed mechanically, such as by mechanisms involving pedals, levers, rods, etc. In other embodiments, the upper cover may include hooks to latch onto the handles of a garbage bag to support and stabilize the garbage bag, as well as assist in closing the garbage bag when the upper cover is opened by pulling the handles upward with its opening motion.

In some embodiments, the door panels are coupled to the upper cover. In other embodiments, the door panels are coupled to the lower base. In still other embodiments, the door panels are coupled to one or more spine structures. In some embodiments, the door panels may be so coupled by hinge mechanisms, including spring-loaded hinges. In other embodiments, the door panels are secured in a closed position by a latch mechanism, including latches, hooks, locks, etc. In various embodiments, two door panels are attached to a spine structure by spring-loaded hinges and are held close by a latch mechanism. When the latch mechanism is released, the door panels may spring open exposing the interior of the container to allow substantially lateral access to the interior of the container. In other embodiments, the upper cover may also be attached to the spine structure by a spring-loaded hinge and held closed by a hook mechanism. In such embodiments, the upper cover may also spring open at the release of the hook mechanism, further exposing the interior of the container.

In some embodiments, the latch and/or hook mechanisms are locked and/or released mechanically, such as by mechanisms involving pedals, levers, rods, etc. In certain embodiments, the latch and/or hook mechanisms are released by a foot pedal or other switch. This foot pedal or switch may be the same mechanism by which the upper cover lid is opened and closed. In still further embodiments, the latch mechanism may be released electronically and/or wirelessly. In still other embodiments, the opening of the door panels may be controlled by hydraulically.

In some embodiments, the base may be concaved in shape so as to stabilize a trash bag or material within the container. In other embodiments, the base may include a pedal that can control the opening of the lid through mechanical means such as rotating rods and levers. In other embodiments, the base may include a pedal that releases the latch mechanism of the door panels and/or the upper cover.

In some embodiments, the same pedal operates the opening of the lid and the unlocking of door panels and upper cover. In such embodiments, the container may include a switch mechanism to alternate between a first mode and a second mode. In the first mode of such embodiments, the pedal only activates the mechanism to open the lid for insertion of material. In the second mode of such embodiments, the pedal releases the latch mechanism to release the door panels open to provide substantially lateral access to the interior of the container. In some embodiments, the switch mechanism may be alternated by mechanically, electronically, or wirelessly.

FIG. 1 depicts an example of a container, in accordance with one or more embodiments. The container 100 in FIG. 1 includes lid 102, cover 104, left door panel 105, right door panel 106, base 108, switch 110, pedal 112, toggle 114, and seal 116. The details of the components of container 100 will be further explained below.

Figure 2:
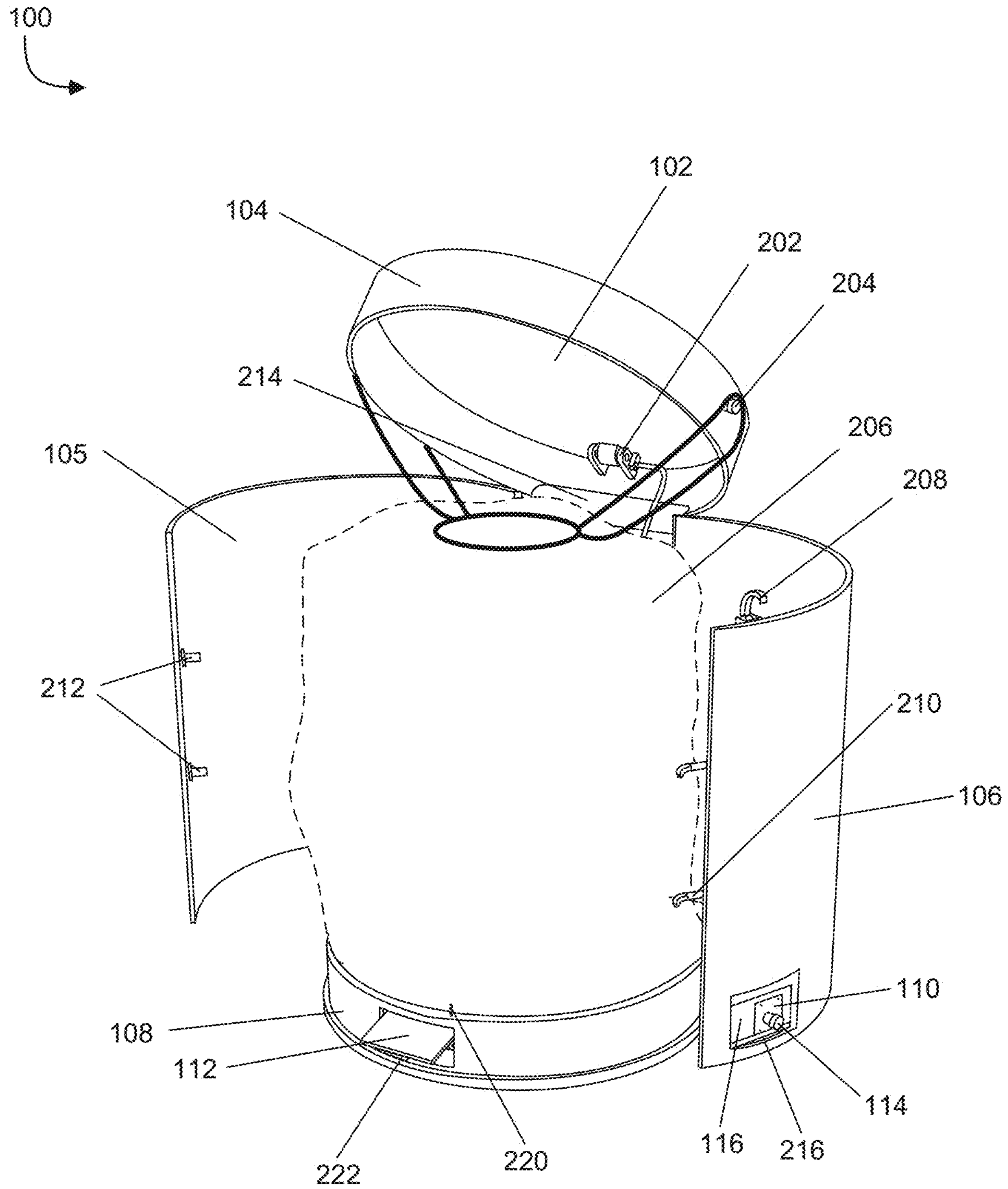
FIG. 2 depicts a particular example of a container in an opened position, in accordance with one or more embodiments.

FIG. 2 depicts a particular example of the container of FIG. 1 in an open position, in accordance with one or more embodiments. Container 100 in FIG. 2 includes lid 102, cover 104, left door panel 105, right door panel 106, base 108, switch 110, pedal 112, toggle 114, seal 116, lid hinge 202, bag hook 204, trash bag 206, cover hook 208, door hook 210, door pin 212, cover hinge 214, switch track 216, pedal front pin 220, and pedal floor rod 222. Base 108 is coupled to pedal 112 by a rail which allows the pedal to be depressed to move pedal floor rod 222 and pedal front pin 220. The structure and mechanism of pedal floor rod 222 and pedal front pin 220 will be further described in the following figures. Trash bag 206 sits within base 108. In certain embodiments, base 108 may contain a stabilizing rim, which may be bowl-shaped, to support the trash bag 206 when full. Trash bag 206 may also include adjustable handles to close the opening. Such handles may be connected to one or more bag hooks 204 which are coupled to cover 104, to provide further stabilization, or assist in closing trash bag 206 when cover 104 is opened. The cover 104 also includes a cover hinge 214 which couples the cover 104 to spine (not shown). Cover hinge 214 may comprise a spring-loaded mechanism to cause cover 104 to stay in an open position when not secured by cover hook 208. The cover 104 also includes a lid hinge 202 which couples the lid 102 to cover 104 and allows lid 102 to open and close.

Right door panel 106 is coupled to cover hook 208 and door hook 210. Right door panel 106 may include one or more door hooks 210 as shown in FIG. 2 which are connected by a vertical door latch rod 308 (not shown) that will be described in the following figures. Door pin 212 is coupled to left door panel 105. Left door panel 105 may include one or more door pins 212 as shown in FIG. 2. The one or more door hooks 210 latches onto corresponding one or more door pins 212 when left door panel 105 and right door panel 106 are in the closed position. Cover hook 208 latches onto a catch 616 to secure the cover 104 in a closed position. Catch 616 is not shown and will be further described in FIGS. 6A and 6B.

Right door panel 106 also includes switch 110 which slides from position A to position B on switch track 216. Switch 110 may include a toggle 114 to assist a user in moving switch 110 from position A to position B. In various embodiments, the shape of toggle 114 may vary to be operated by hand, foot, or other body part. Switch 110 may also include a seal 116 that moves to keep any opening sealed when the switch is moved. When switch 110 is in position A, the pedal 112 will only cause the opening and closing of lid 102 via pedal floor rod 222. When switch 110 is in position B, the pedal 112 will release door hook 210 and cover hook 208 and cause cover 104, left door panel 105, and right door panel 106 to open and allow substantial lateral access to the interior of container 100. The structure and mechanism of the switch 110 will be further described in the following figures.

Although various structures are described herein as coupled to either left door panel 105 and/or right door panel 106, in various embodiments, such structures may be coupled to any of the door panels.

Figure 3:
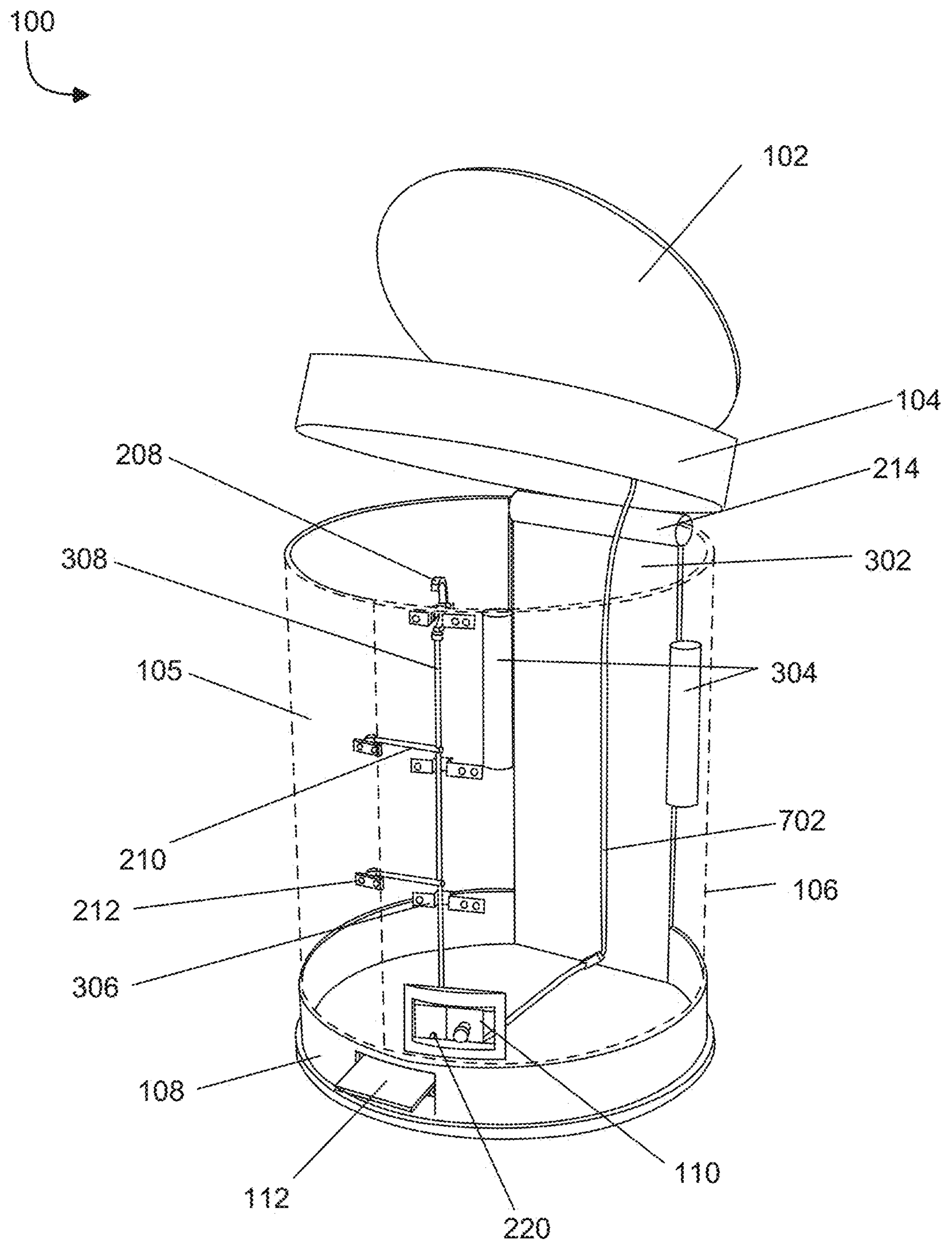
FIG. 3 depicts a particular example of a container upper cover and lid in opened position, in accordance with one or more embodiments.

FIG. 3 depicts a particular example of the container with door panels in closed position, in accordance with one or more embodiments. Container 100 includes lid 102, cover 104, left door panel 105, right door panel 106, base 108, switch 110, pedal 112, cover hook 208, one or more door hooks 210, one or more door pins 212, cover hinge 214, spine 302, one or more door hinges 304, door latch bracket 306, and door latch rod 308. Spine 302 is coupled to base 108. Spine 302 is also coupled to cover 104 by cover hinge 214. Cover hinge 214 may comprise a spring-loaded mechanism to cause cover 104 to stay in an open position when not secured by cover hook 208. Left door panel 105 and right door panel 106 are coupled to spine 302 by hinges 304. Hinges 304 may comprise a spring-loaded mechanism to cause left door panel 105 and right door panel 106 to stay in an open position when not secured by door hooks 210 and door pins 212. With left door panel 105 and right door panel 106 in closed position, one or more door hooks 210 is latched onto one or more door pins 212. The one or more door hooks 210 is coupled by a vertical door latch rod 308. Door latch rod 308 is coupled to right door panel 106 by door latch brackets 306, which keep the door latch in place. Door latch brackets 306 may be coupled to right door panel 106 by welding, rivet, or screw. Door latch rod 308 extends the length of right door panel 106 and makes contact with the mechanism of switch 110 and the mechanism of cover hook 208. In some embodiments, cover 104, left door panel 105, and right door panel 106 may be opened and/or closed mechanically. In further embodiments, cover 104, left door panel 105, and right door panel 106 may be opened and/or closed electronically and/or wirelessly.

In some embodiments, container 100 comprises a single door panel. In other embodiments container 100 comprises two panels as depicted in the examples above. Still in other embodiments, container 100 comprises three or for door panels. In various embodiments, having more door panels allows for partial openings of door panels in addition to a full opening. For example, in embodiments with four door panels, container 100 can have two separate/different door panel opening modes: one mode that opens 2 panels (for ease of removal of smaller objects or access the inside of the container without releasing the entire garbage bag), and another mode that opens all four door panels (for release and removal of a full garbage bag as herein described).

In some embodiments, container 100 is controlled electronically with sensors. For example, in some embodiments, the lid can open with a movement of a user relatively close and within a sensing range of a first sensor located on the container. In some embodiments, a second sensor located on the container (in a position far enough away that the first sensor range does not overlap with the second sensor range) controls the switching mechanism of the container such that a movement of the user within the sensing range of the second sensor causes the container to open all door panels or at least switch into a full open mode, wherein a subsequent movement by the user within the first sensor range, after the container switches into the full open mode, will cause the container to fully open (all doors open allowing substantially lateral access to the garbage bag). In some embodiments, only one sensor is used. In such embodiments, directionality of the user movement within the sensor range is used to determine function. For example, a substantially vertical movement across the sensor can cause the container lid to open. However, a substantially horizontal movement across the sensor may cause the container to switch modes, with a subsequent vertical movement across the sensor leading to fully opening the container. In such embodiments, each horizontal movement within the sensor range causes the container to switch modes between a regular mode and a fully open mode. In some embodiments, the sensors require a threshold amount of sensed movement or threshold amount of time for detected movements in order to cause the container to perform an action or switch modes. That way, sensitivity of the sensor response is somewhat reduced in order to avoid unintentionally detected movements causing the container to perform and action or switch modes.

Figure 4:
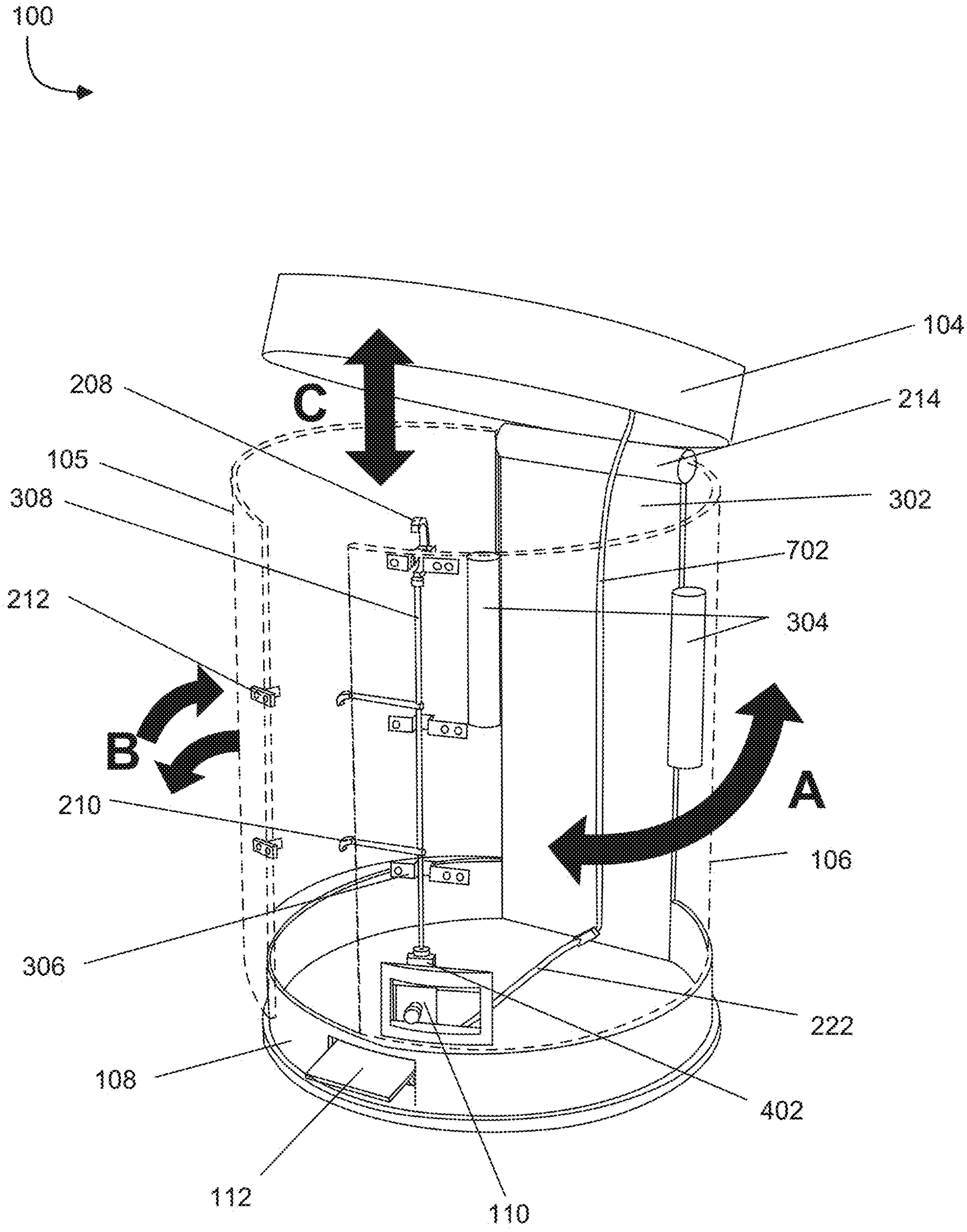
FIG. 4 depicts another example of a container in an opened position, in accordance with one or more embodiments.

FIG. 4 depicts another example of the container in an open position with door panels depicted as transparent, in accordance with one or more embodiments. In FIG. 4, container 100 includes cover 104, left door panel 105, right door panel 106, base 108, switch 110, pedal 112, cover hook 208, one or more door hooks 210, one or more door pins 212, cover hinge 214, pedal floor rod 222, spine 302, one or more door hinges 304, door latch bracket 306, door latch rod 308, and vertical pin 402. As previously described, spine 302 is coupled to base 108. Spine 302 is also coupled to cover 104 by cover hinge 214. Cover hinge 214 may comprise a spring-loaded mechanism to cause cover 104 to stay in an open position when not secured by cover hook 208. Left door panel 105 and right door panel 106 are coupled to spine 302 by hinges 304. One or more door hinges 304 may comprise a spring-loaded mechanism to cause left door panel 105 and right door panel 106 to stay in an open position when not secured by one or more door hooks 210 and one or more door pins 212.

Vertical pin 402 is housed in switch 110. The structure of switch 110 will be further described in FIGS. 5A, 5B, and 5C. When switch 110 is placed in position B, the use of pedal 112 will engage vertical pin 402, which in turn will engage door latch rod 308 causing one or more door hooks 210 to lift and unlatch from one or more door pins 212, allowing left door panel 105 to move in the directions of arrows B and right door panel 106 to move in the directions of arrow A. This mechanism will be further described in FIGS. 5B and 5C. Door latch rod 308 also engages cover hook 208 to unlatch from cover 104, allowing cover 104 to move in the directions of arrow C. This mechanism will be further described in FIGS. 6A, 6B, and 6C.

Figure 5A:
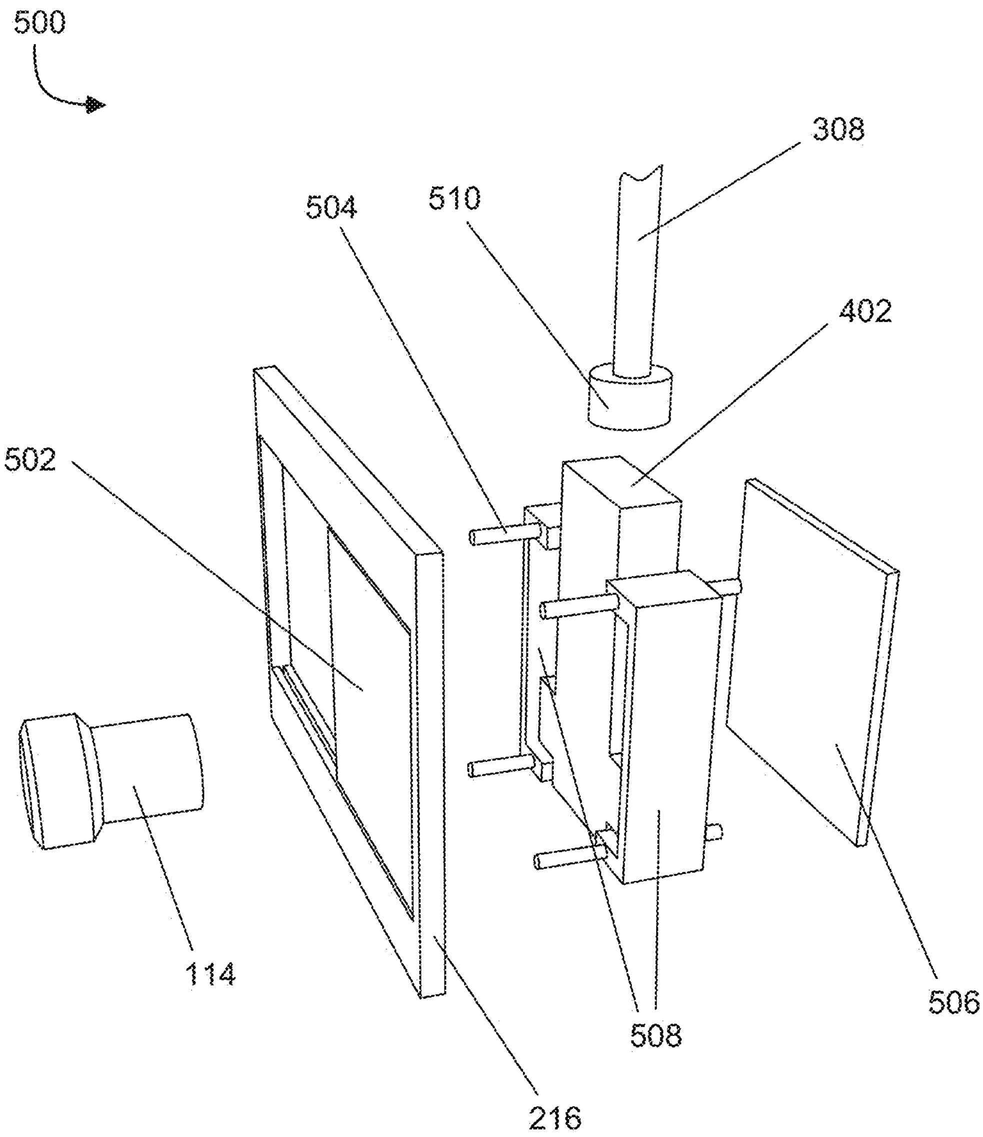
FIG. 5A depicts a particular example of a switch mechanism in accordance with one or more embodiments.

FIG. 5A depicts a particular example of a switch mechanism in accordance with one or more embodiments. Switch mechanism 500 in FIG. 5A includes toggle 114, guide track 216, vertical pin 402, toggle slider 502, guide pins 504, back brace housing 506, and vertical pin housing 508. These components comprise switch 110 from the previous figures. In some embodiments, switch mechanism 500 may be switch 110, as previously described. Switch mechanism 500 also includes door latch rod 308 coupled to lower door latch bumper 510. Vertical pin 402 is encased on either side by vertical pin housing 508 in a fashion to allow vertical pin 402 to move vertically independent of vertical pin housing 508. In this manner, vertical pin 402 may make contact with door latch rod 308 and lower door latch bumper 510. Guide pins 504 couple the vertical pin housing 508 to back brace housing 506 and toggle slider 502 further encasing vertical pin 402. Toggle 114 is coupled to toggle slider 502. The toggle slider may move horizontally between the guide track 216 causing the same horizontal motion to vertical pin 402, vertical pin housing 508, and back brace housing 506.

Figure 5B:
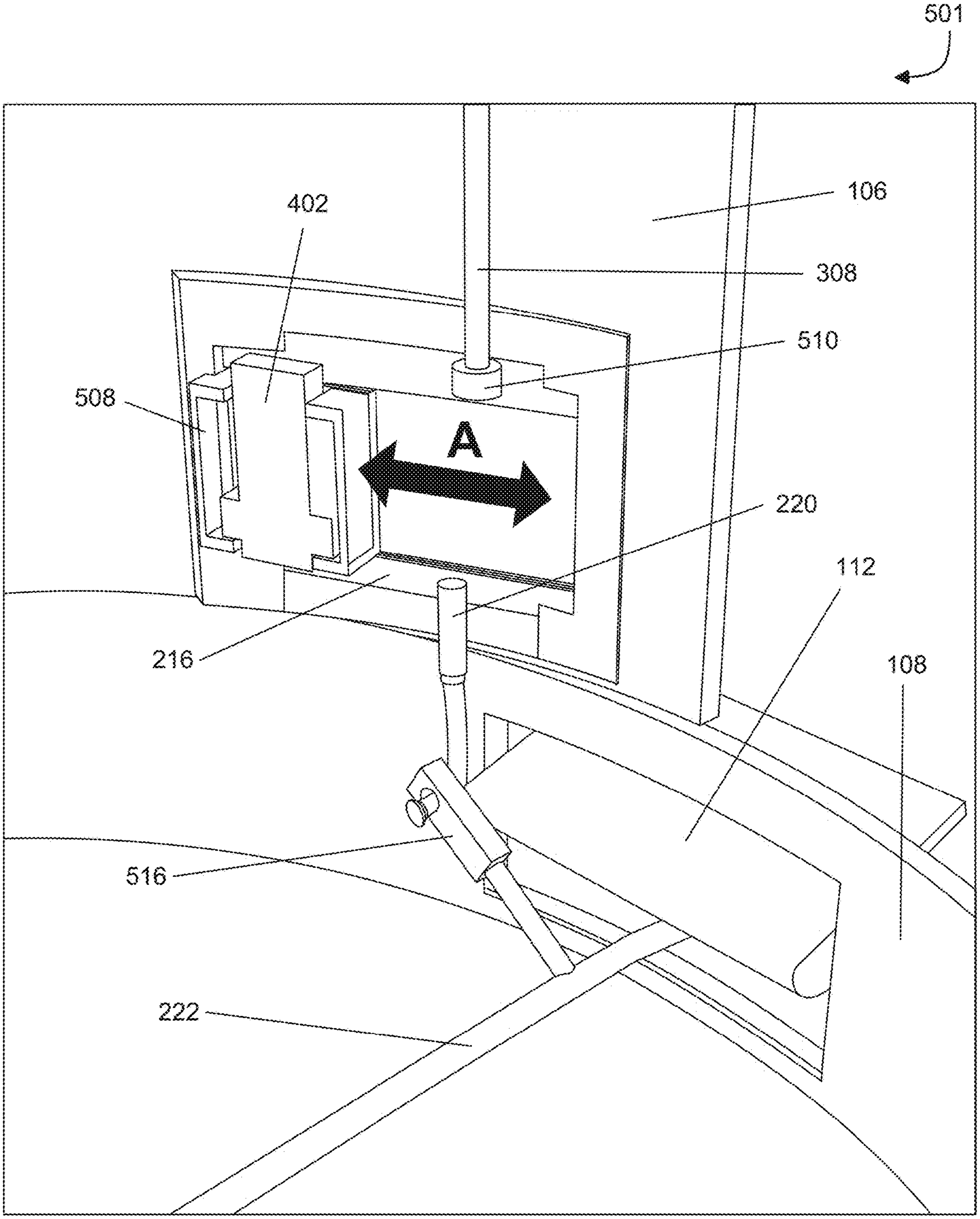
FIG. 5B depicts a particular example of a switch mechanism in accordance with one or more embodiments.

FIG. 5B depicts a particular example of a switch mechanism 501 in accordance with one or more embodiments. In some embodiments, switch mechanism 501 may be switch mechanism 500. Switch mechanism 501 in FIG. 5B includes right door panel 106, base 108, pedal 112, guide track 216, pedal front pin 220, pedal floor rod 222, door latch rod 308, vertical pin 402, vertical pin housing 508, door latch bumper 510, and pedal front pin joint 516. The switch mechanism of FIG. 5A is shown here coupled to the right door panel 106. The toggle guide track 216 is coupled to right door panel 106 by welding, rivets, screw or similar means, allowing vertical pin 402 encased in vertical pin housing 508 to move freely in the directions of arrow A between position A and position B. Switch mechanism 501, as depicted in FIG. 5B, is shown in position A. Door latch rod 308 is also coupled to right door panel 106 by brackets such as door latch bracket 306 in FIGS. 3 and 4, and includes lower door latch bumper 510. Pedal 112 is coupled to base 108 by a rail, or similar means, to allow pedal to be depressed and engage pedal floor rod 222. Pedal floor rod 222 is coupled to base 108 and includes pedal front pin joint 516, which is coupled to pedal front pin 220. Pedal front pin 220 is secured to base 108 by a bracket (not shown).

Figure 5C:
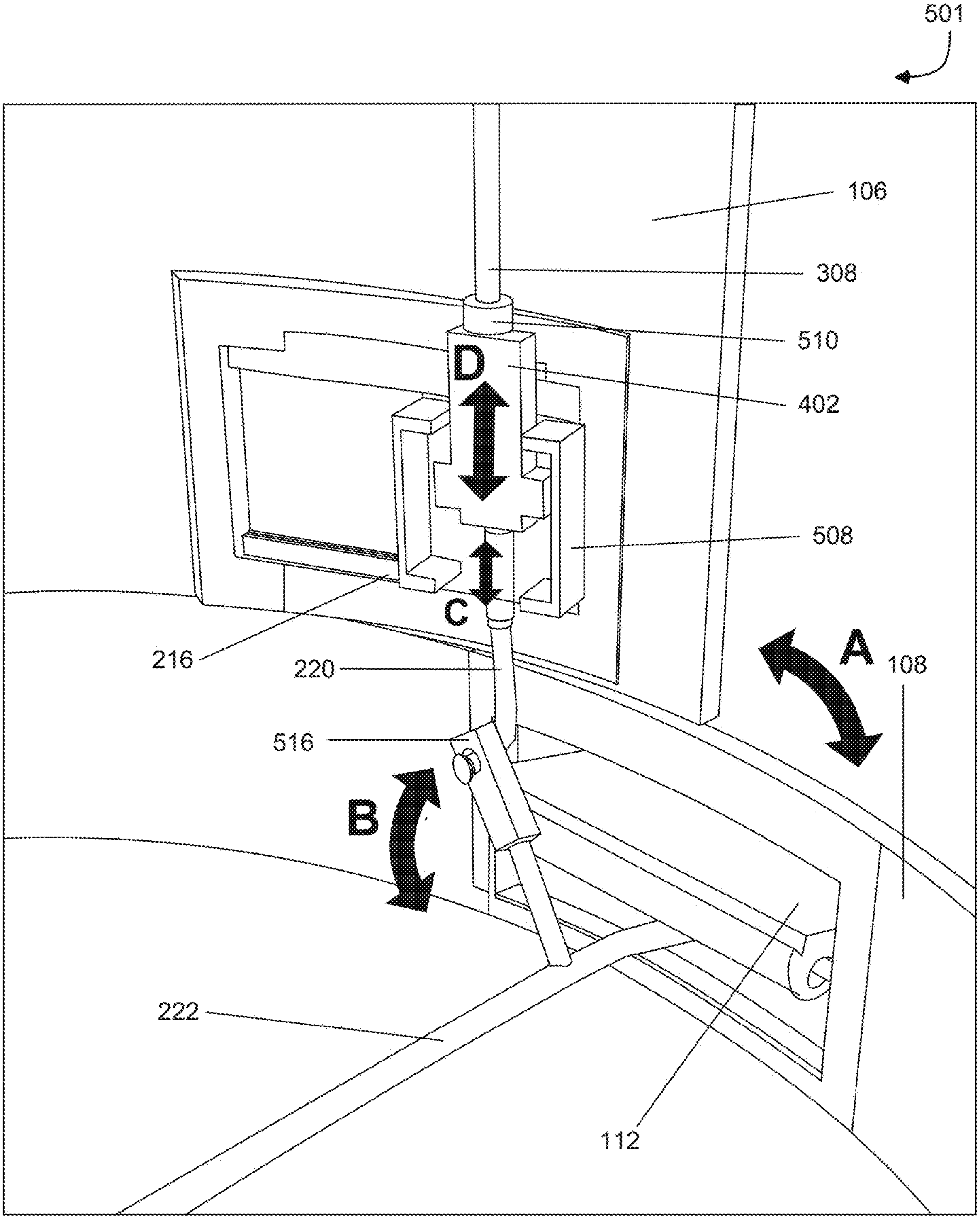
FIG. 5C depicts another example of a switch mechanism in accordance with one or more embodiments.

FIG. 5C depicts another example of switch mechanism 501 in accordance with one or more embodiments. Switch mechanism 501 in FIG. 5C includes right door panel 106, base 108, pedal 112, guide track 216, pedal front pin 220, pedal floor rod 222, door latch rod 308, vertical pin 402, vertical pin housing 508, door latch bumper 510, and pedal front pin joint 516. The switch mechanism of FIG. 5A is shown here coupled to the right door panel 106. The toggle guide track 216 is coupled to right door panel 106 by welding, rivets, screw or similar means, allowing vertical pin 402 encased in vertical pin housing 508 to move freely in a horizontal direction between position A and position B. Switch mechanism 501, as depicted in FIG. 5C, is shown in position B. Door latch rod 308 is also coupled to right door panel 106 by brackets such as door latch bracket 306 in FIGS. 3 and 4, and includes lower door latch bumper 510. Pedal 112 is coupled to base 108 by a rail, or similar means, to allow pedal to be depressed and engage pedal floor rod 222. Pedal floor rod 222 is coupled to base 108 and includes pedal front pin joint 516, which is coupled to pedal front pin 220. Pedal front pin 220 is secured to base 108 by a bracket (not shown).

When switch mechanism 501 is in position B, vertical pin 420 is aligned vertically with pedal front pin 220 and door latch rod 308. When pedal 112 is depressed in the directions of arrow A, pedal floor rod 222 is engaged in a rotational motion in the directions of arrow B. This rotational motion causes pedal front pin joint 516 to rotate in the directions of arrow B pushing pedal front pin 220 upwards in the direction of arrow C, which pushes vertical pin 420 upwards in the direction of arrow D, which makes contact with door latch bumper 510 to push door latch rod 308 up. The upward motion of door latch rod 308 releases door hooks 210 from door pins 212 to allow door panels 105 and 106 to be opened as shown in FIGS. 2 and 4.

When switch mechanism 501 is in position A, as shown in FIG. 5B, the vertical pin 402 is not aligned with pedal front pin 220 and door latch rod 308. In position A, depressing pedal 112 will engage pedal floor rod 222, but will not contact vertical pin 402 or door latch rod 308.

Figure 6A:
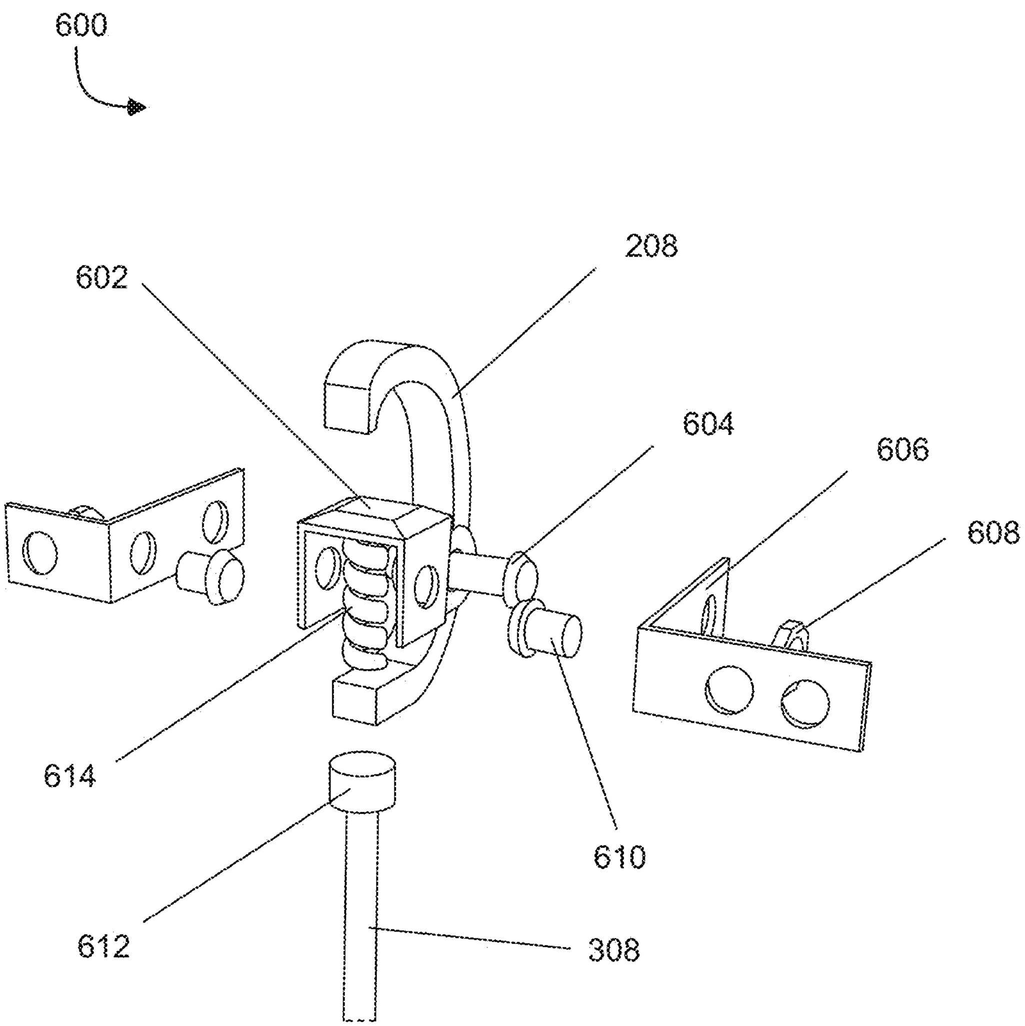
FIG. 6A depicts a particular example of a cover hook mechanism in accordance with one or more embodiments.

FIG. 6A depicts a particular example of a cover hook mechanism in accordance with one or more embodiments. Cover hook mechanism 600 includes cover hook 208, door latch rod 308, spring anchor 602, hook hinge pin 604, one or more hook brackets 606, one or more spring guide nuts 608, one or more spring guide screws 610, top door latch bumper 612, and hook spring 614. Cover hook 208 is coupled to one or more hook brackets 606 by hook hinge pin 604. Spring anchor 602 is coupled to one or more hook brackets 606 by one or more spring guide screws 610, which are secured by one or more spring guide nuts 608. In some embodiments, cover hook 208 is a C-shaped hook, and spring 614 is nestled within spring anchor 602 and the lower end of hook 208, pushing downward on the lower end of hook 208. When door latch rod 308 is lifted by way of the switch mechanism described in FIG. 5C, top door latch bumper 612 makes contact with the lower end of cover hook 208 to oppose the force of the spring 614 and pivot cover hook 208 along hook hinge pin 604.

Figure 6B:
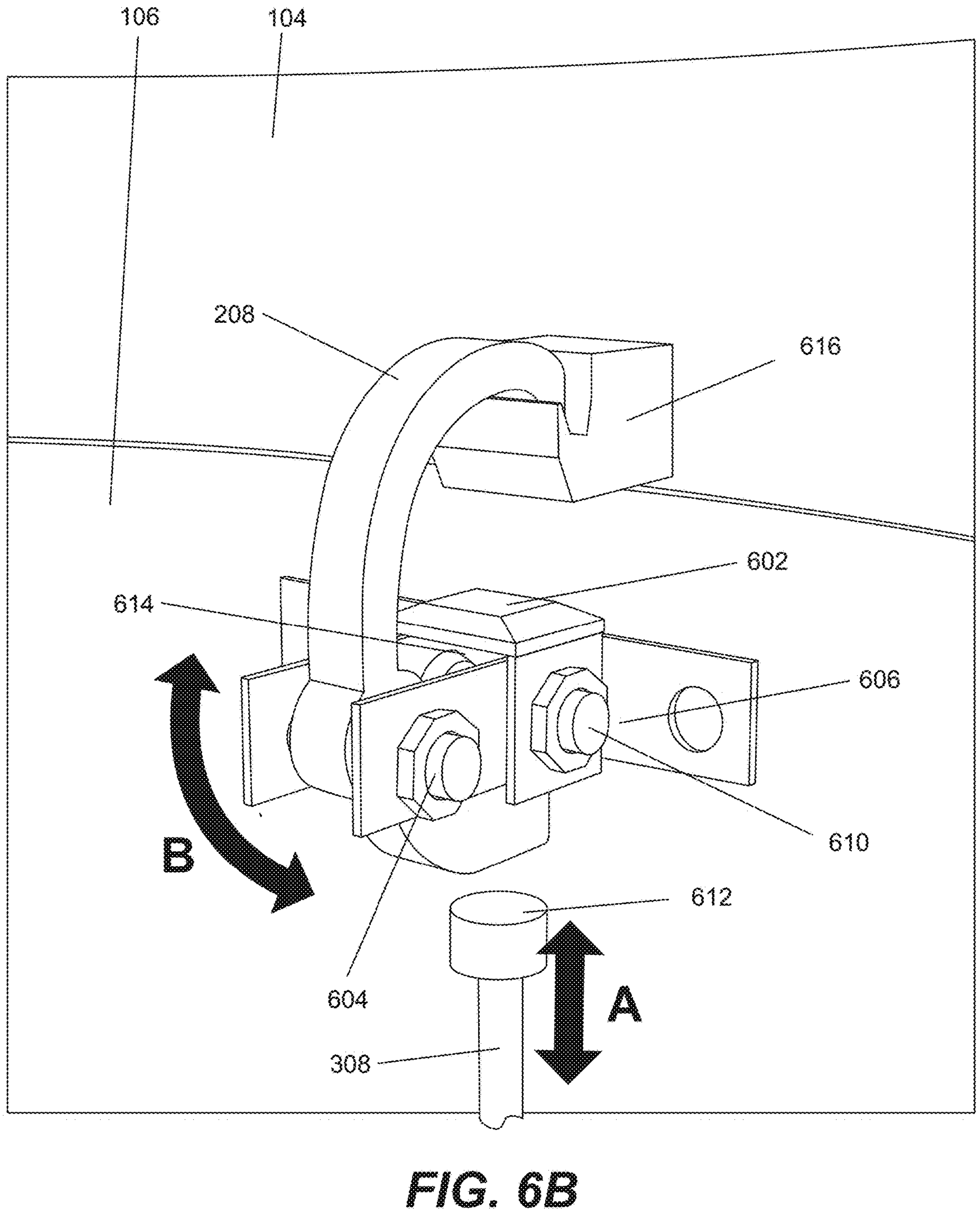
FIG. 6B depicts another example of a cover hook mechanism in accordance with one or more embodiments.

FIG. 6B depicts another example of cover hook mechanism 600 implemented in container 100, in accordance with one or more embodiments. Cover hook mechanism 600, as shown in FIG. 6B, includes cover 104, right door panel 106, cover hook 208, door latch rod 308, spring anchor 602, hinge pin 604, one or more hook brackets 606, one or more spring screws 610, top door latch bumper 612, spring 614, and cover hook catch 616. Cover hook 208 is coupled to one or more hook brackets 606 by hook hinge pin 604. Spring anchor 602 is also coupled to one or more hook brackets 606 by one or more spring guide screws 610. One or more hook brackets 606 couple the cover hook 208 and spring anchor 602 to right door panel 106. In some embodiments, cover hook 208 is a C-shaped hook, and spring 614 is nestled within spring anchor 602 and the lower end of hook 208. Spring 614 pushes downward on the lower end of cover hook 208, and forcing cover hook 208 in the upward direction of arrow B. Cover hook catch 616 is coupled to cover 104 and cover hook 208 latches on to cover hook catch 616 to secure cover 104 in a closed position, as depicted in FIG. 6B.

Figure 6C:
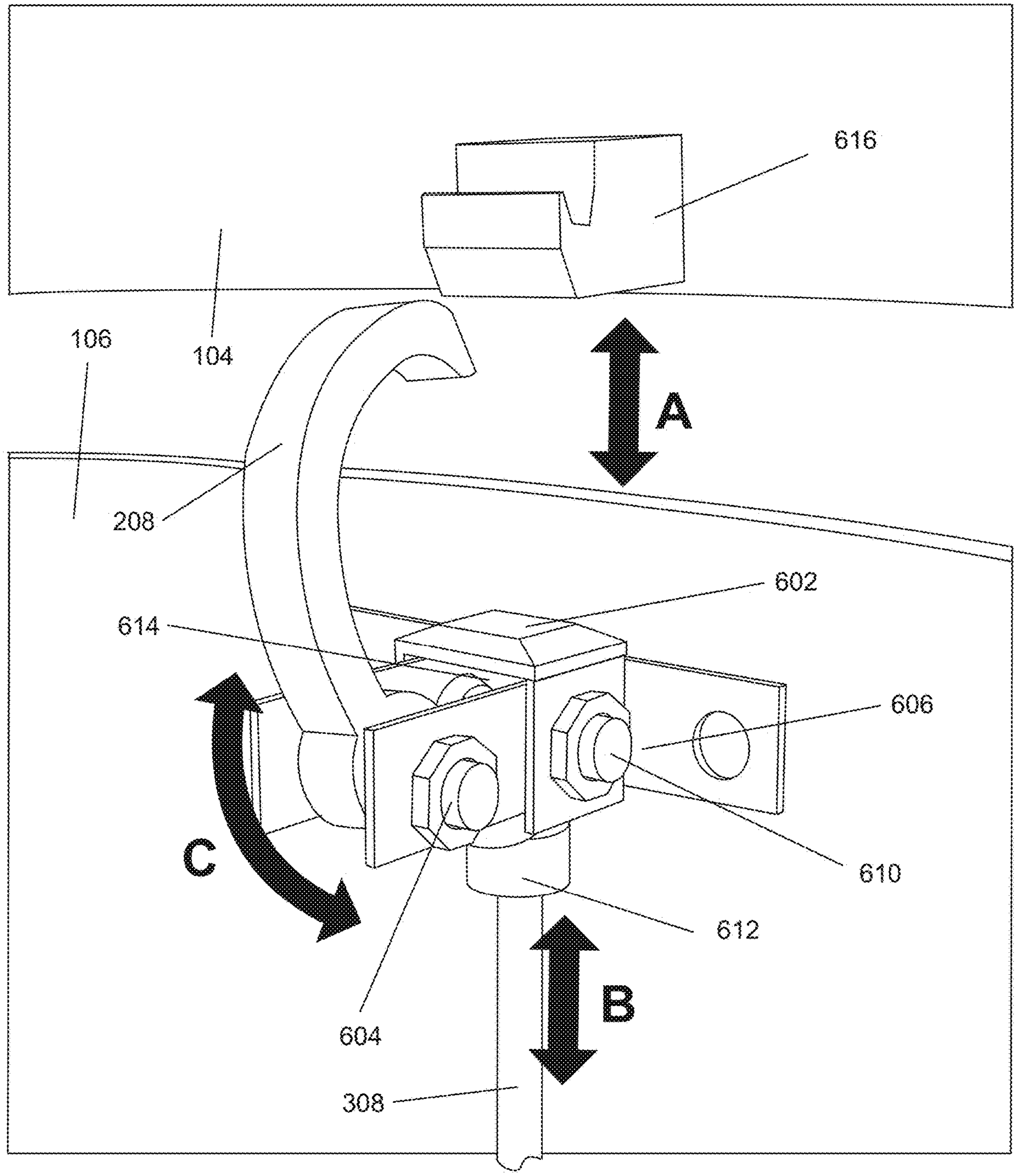
FIG. 6C depicts another example of a cover hook mechanism in accordance with one or more embodiments.

FIG. 6C depicts another example of cover hook mechanism 600 implemented in container 100, in accordance with one or more embodiments. Cover hook mechanism 600, as shown in FIG. 6B, includes cover 104, right door panel 106, cover hook 208, door latch rod 308, spring anchor 602, hinge pin 604, one or more hook brackets 606, one or more spring screws 620, top door latch bumper 612, spring 614, and cover hook catch 616. Cover hook 208 is coupled to hook brackets 606 by hook hinge pin 604. Spring anchor 602 is also coupled to one or more hook brackets 606 by one or more spring guide screws 610. One or more hook brackets 606 couple the cover hook 208 and spring anchor 602 to right door panel 106. In some embodiments, cover hook 208 is a C-shaped hook, and spring 614 is nestled within spring anchor 602 and the lower end of hook 208. Spring 614 pushes downward on the lower end of cover hook 208, and forcing cover hook 208 in the upward direction of arrow C. Cover hook catch 616 is coupled to cover 104 and cover hook 208 latches on to cover hook catch 616 to secure cover 104 in a closed position.

When door latch rod 308 is lifted in the upward direction of arrow B by way of the switch mechanism described in FIG. 5C, top door latch bumper 612 makes contact with the lower end of cover hook 208 to oppose the force of spring 614, causing cover hook 208 to pivot in the downward direction of arrow C and releasing cover hook 208 from cover hook catch 616 to allow cover 104 to be opened, as depicted in FIG. 6C.

Figure 7:
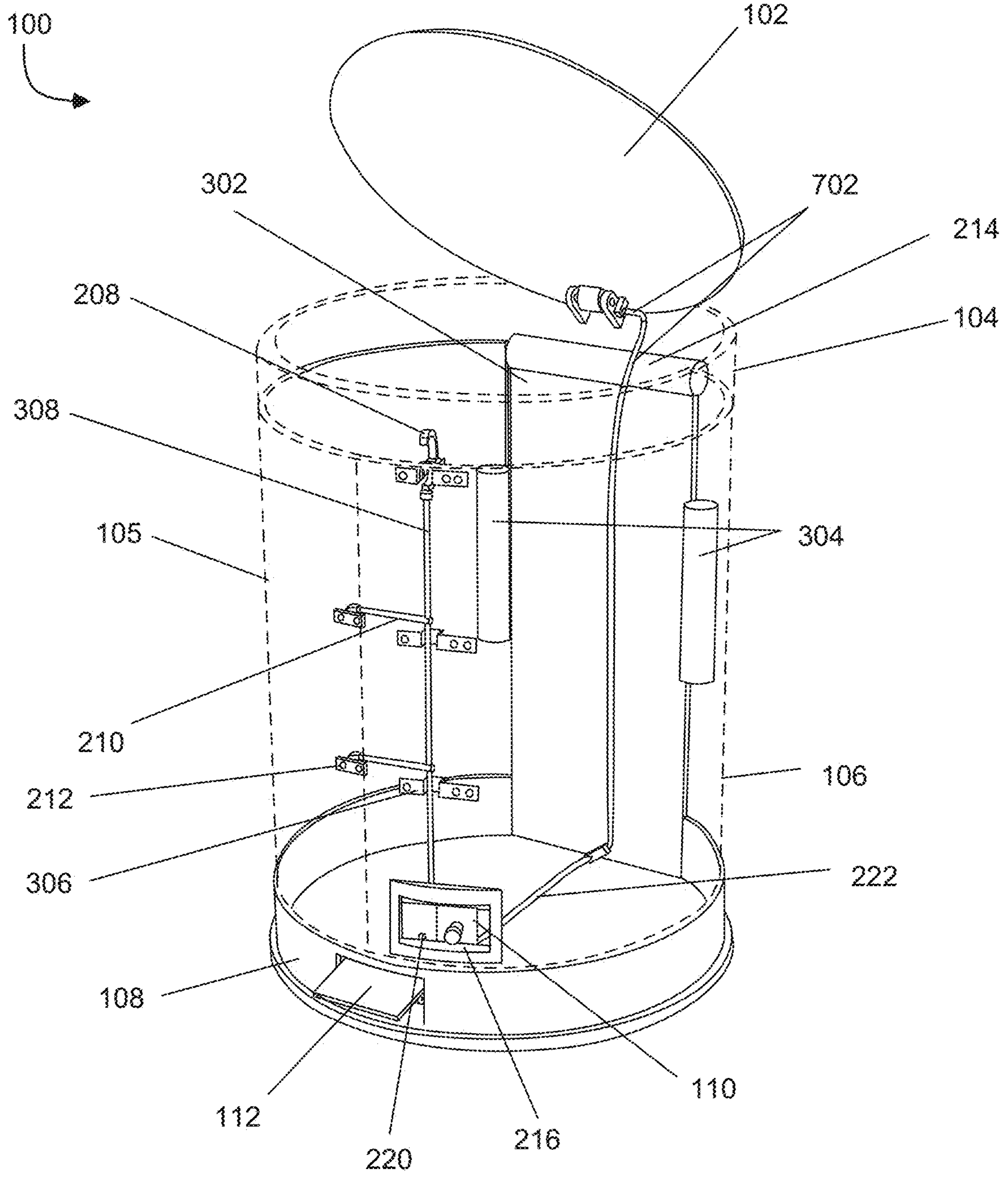
FIG. 7 depicts a particular example of a container with a lid in opened position, in accordance with one or more embodiments.

FIG. 7 depicts a particular example of the container with a lid in an open position, in accordance with one or more embodiments. Container 100 in FIG. 7 includes lid 102, cover 104, left door panel 105, right door panel 106, base 108, switch 110, pedal 112, cover hook 208, one or more door hooks 210, one or more door pins 212, cover hinge 214, switch track 216, pedal front pin 220, pedal floor rod 222, spine 302, one or more door hinges 304, one or more door latch brackets 306, door latch rod 308, and pedal spine rod 702. Spine 302 is coupled to base 108. Spine 302 is also coupled to cover 104 by cover hinge 214. Cover hinge 214 may comprise a spring-loaded mechanism to cause cover 104 to stay in an open position when not secured by cover hook 208. Left door panel 105 and right door panel 106 are coupled to spine 302 by one or more door hinges 304. One or more door hinges 304 may comprise a spring-loaded mechanism to cause left door panel 105 and right door panel 106 to stay in an open position when not secured by one or more door hooks 210 and one or more door pins 212. With left door panel 105 and right door panel 106 in closed position, one or more door hooks 210 are latched onto corresponding one or more door pins 212. The one or more door hooks 210 are coupled by a vertical door latch rod 308. Door latch rod 308 is coupled to right door panel 106 by one or more door latch brackets 306, which keep the door latch in place. One or more door latch brackets 306 may be coupled to right door panel 106 by welding, rivet, or screw. Door latch rod 308 extends the length of right door panel 106 and makes contact with the mechanism of switch 110 and the mechanism of cover hook 208. Right door panel 106 also includes switch 110 which slides from position A to position B on switch track 216.

Further in FIG. 7, base 108 includes pedal 112 that is coupled by a rail, or similar means, to allow pedal to be depressed and engage pedal floor rod 222 in a rotational motion as shown in FIGS. 5B and 5C. Pedal floor rod 222 is coupled to base 108 and is coupled to pedal front pin 220 as shown in FIGS. 5B and 5C. The rotational motion of pedal floor rod 222 caused by depression of pedal 112 pushes pedal front pin 220 upward. Pedal floor rod 222 is further coupled to pedal spine rod 702, which may be secured to spine 302 by bracket or similar means. The rotational motion of pedal floor rod 222 caused by depression of pedal 112 causes pedal spine rod 702 to lift upward pushing lid 102 to an open position. In some embodiments, pedal floor rod 222 and pedal spine rod 702 may a single structure.

In some embodiments, cover 104 and 102 may be a single structure that covers the top opening of container 100. In some embodiments, such a single structure may be a single flat structure, similar to lid 102, or such single structure may include a lip or rim, similar to how cover 104 and lid 102 are depicted in FIG. 2. In some embodiments, container 100 may be configured to open such single structure via the first mechanism and/or mode via pedal and rod mechanisms described herein and below. In some embodiments, the mechanisms associated with the first mechanism and/or position A of switch 110, may operate to release cover hook 208 from cover hook catch 616. In other embodiments, the latch mechanism may not include door hook 208, cover hook catch 616, and/or any of the components of cover hook mechanism 600, in order to separate lid/cover functioning from the door latch mechanism.

When switch 110 is in position B, as shown in FIG. 4, the pedal 112 will cause pedal front pin 220 to engage the switch mechanism of switch 110 to release one or more door hooks 210, as described in FIG. 5C, and cover hook 208, as described in FIG. 6C, and cause cover 104, left door panel 105, and right door panel 106 to open and allow substantially lateral access to the interior of container 100. When switch 110 is in position A, as shown in FIG. 7, pedal front pin 220 does not engage the switch mechanism of switch 110, and depression of pedal 112 only causes lid 102 to open as previously described.

Figure 8A:
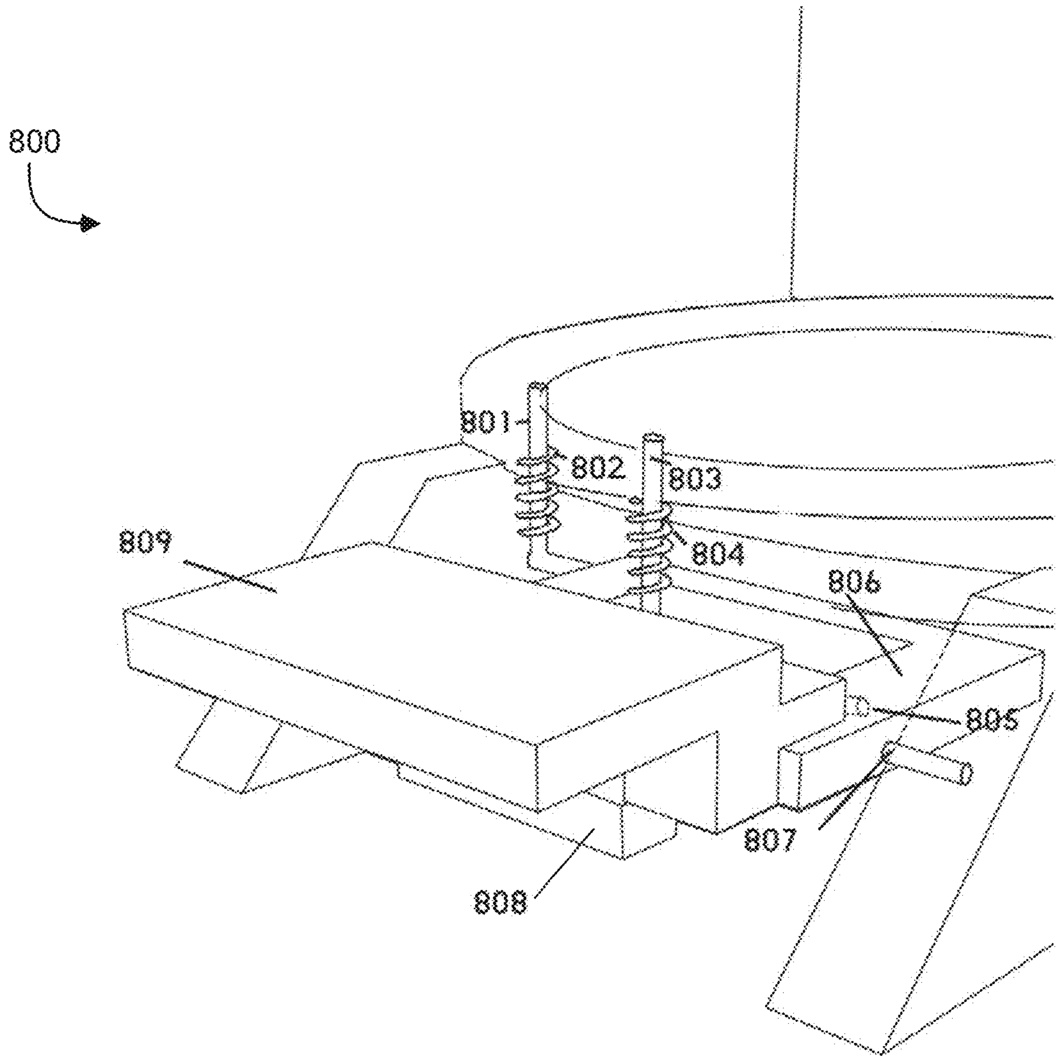
FIGS. 8A, 8B, and 8C depict an example of a pedal mechanism, in accordance with one or more embodiments.
Figure 8B:
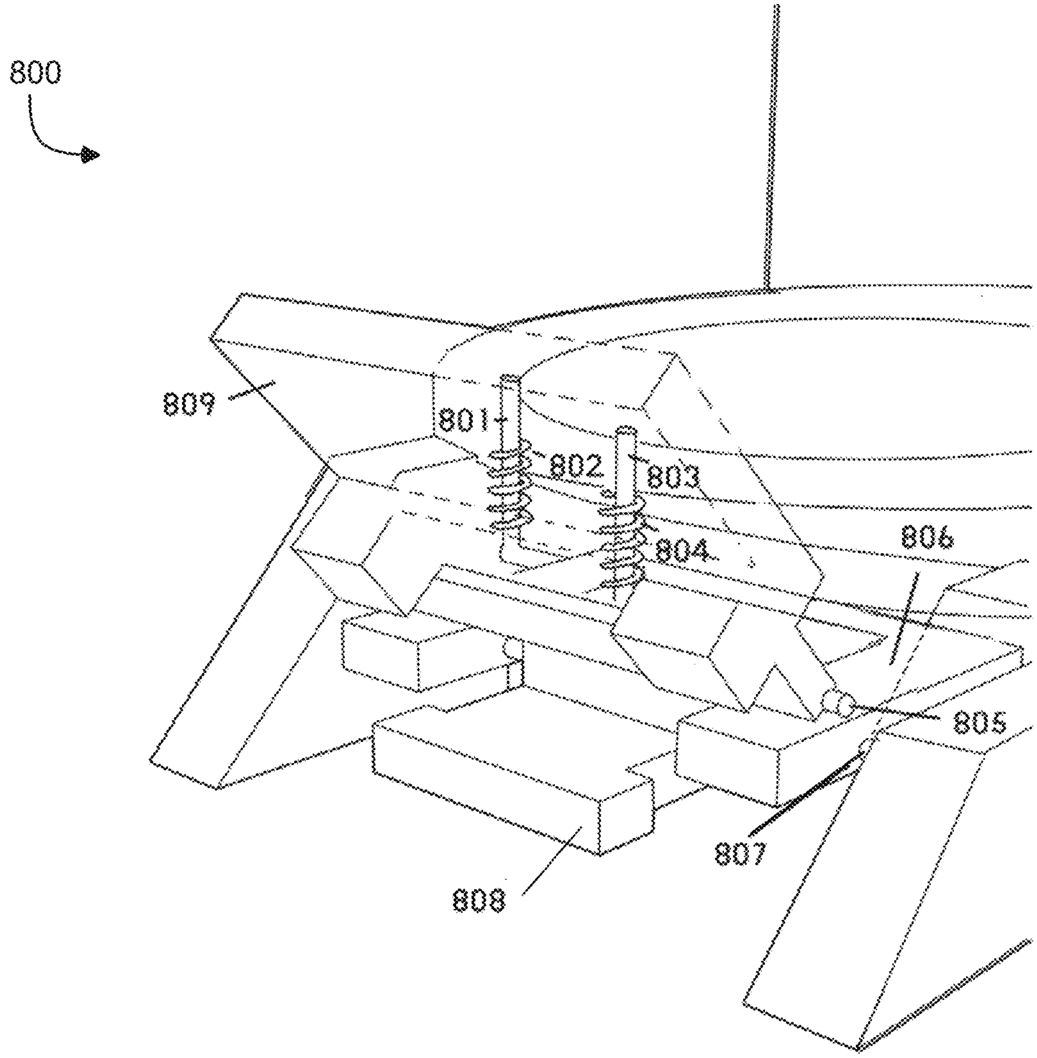
Figure 8C:
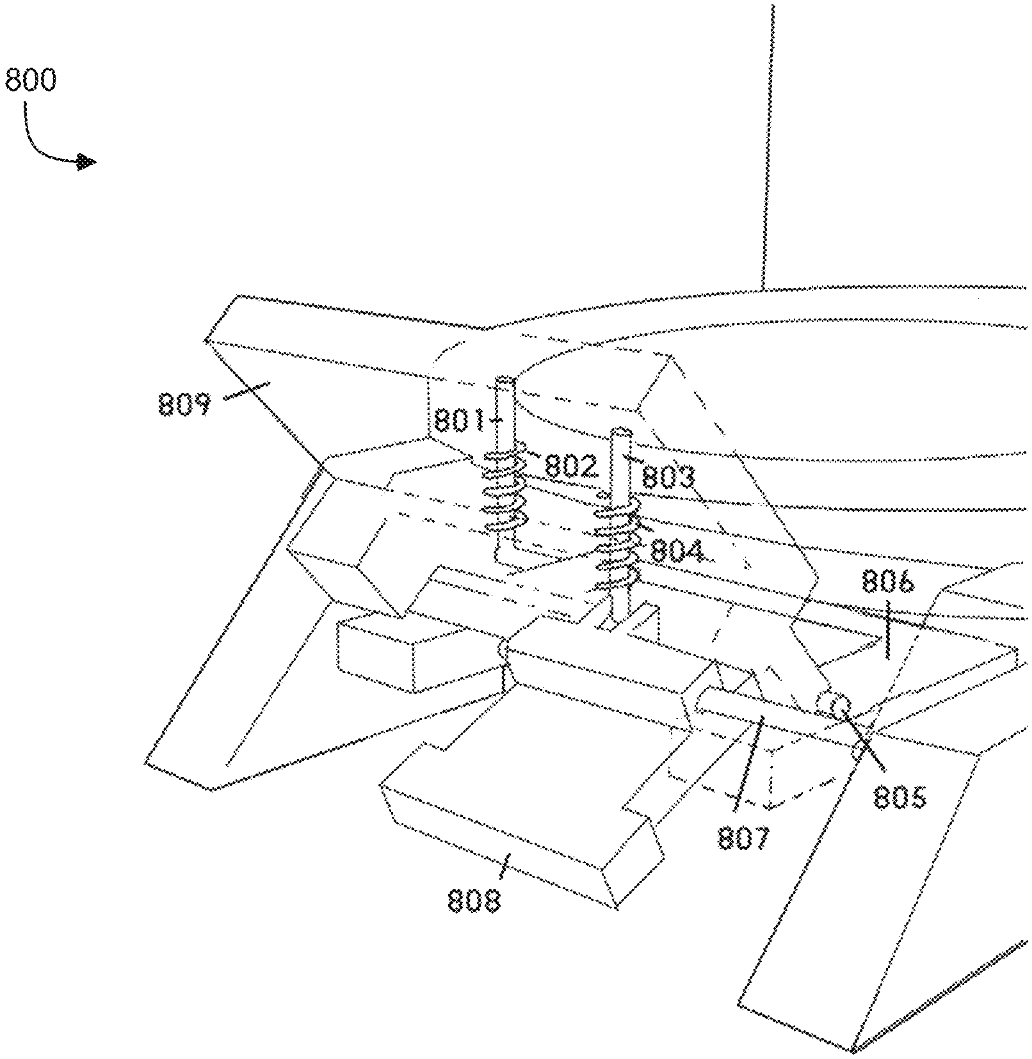

In further embodiments, container 100 may include alternate mechanisms for opening the lid and/or releasing the cover hook 208 and door hooks 210. FIGS. 8A, 8B, and 8C depict an example of a pedal mechanism 800, in accordance with one or more embodiments. As depicted in FIGS. 8A-8C, pedal mechanism 800 includes lid pin 801, lid pin spring 802, container pin 803, container pin spring 804, pedal pivot rail 805, lid pedal base 806, container pedal rail 807, container pedal 808, and lid pedal 809. Pedal mechanism 800 includes a dual pedal system, which can alternate between activation of lid pedal 809 to open and close lid 102, and container pedal 808 to release of door hook 210 and cover hook 208.

In some embodiments, lid pedal 809 forms a larger pedal that sits on top of container pedal 808. In some embodiments, lid pedal 809 may be activated by stepping down to depress lid pedal 809. In some embodiments, lid pedal 809 is coupled to lid pedal base 806. In some embodiments, lid pedal base 806 may further be coupled pedal floor rod 222, which is further coupled to pedal spine rod 702, previously described. Thus, depression of lid pedal 809 may activation of the aforementioned structures to cause lid 102 to open. In some embodiments, lid pedal 809 may be directly coupled to pedal floor rod 222. In other embodiments, activation of lid pin 801 may cause opening of lid 102 through other mechanisms. In some embodiments, lid pedal base 806 is also coupled to lid pin 801. In some embodiments, lid pin 801 may be coupled to pedal floor rod 222, and depression of lid pedal 809 activates lid pin 801. Such activation of lid pin 801 may cause pedal floor rod 222 to cause lid 102 to open, as previously described.

In various embodiments, lid pedal 809 includes a cavity such that when depressed, lid pedal 809 does not make contact with container pedal 808. Thus, use of pedal 809 does not cause container pedal 808 to be depressed to cause door panels 105 and/or 106 and/or cover 104 to unlock and open, as described previously and further below. In other embodiments, lid pedal 809 and container pedal may not be configured as a single pedal system 800. For example, lid pedal 809 and container pedal 808 may be positioned adjacently as two separate pedals. In further embodiments, lid pedal 809 and container pedal 808 may be positioned in separate portions of the container 100, such as on different portions of base 102.

In other embodiments, lid pin 801 may serve as a biasing mechanism. In some embodiments, lid pin 801 supports lid pin spring 802, which wraps around lid pin 801. In some embodiments, lid pin spring 802 biases lid pedal 809 to ensure that lid pedal base 806, and consequently lid pedal 809, returns to the starting un-depressed position and/or that lid 102 returns to the closed position.

In some embodiments, lid pedal 809 may be raised to expose container pedal 808. As depicted in FIG. 8B, lid pedal 809 may pivot upwards around pedal pivot rail 805. Such movement may be caused by engaging the bottom of lid pedal 809 with a user's foot and lifting upwards. In other embodiments, lid pedal 809 may be lifted through other mechanical and/or electronic means. In some embodiments, lid pedal 809 remains in upward lifted position, due to friction and/or other latch mechanism or locking mechanism.

In some embodiments, container pedal 808 may be activated by stepping down to depress container pedal 808, which may pivot downward around container pedal rail 807. FIG. 8C depicts pedal mechanism 800 with lid pedal 809 in the upward position and container pedal 808 in the depressed position. In some embodiments, depression of container pedal 808 activates door latch rod 308 in an upward motion to release door hooks 210 and open door panels 105 and 106 and/or cover 104, as previously described. In some embodiments, depression of container pedal 808 also activates container pin 803, which forces container pin 803 in an upward motion. Such upward motion of container pin 803 may cause release of door hooks 210 and/or cover hook 208. In some embodiments, container pin 803 may be pedal front pin 220. In some embodiments of container 100 that include pedal mechanism 800 as herein described, switch 110 may not be included because pedal mechanism 800 eliminates the need to alternate between position A and position B. In such embodiments, pedal front pin 220 and door latch rod 308 may comprise a single structure that is activated by depression of container pedal 808. In some embodiments, container pin 803 may be the single structure comprising of pedal front pin 220 and door latch rod 308.

In some embodiments, container pin spring 804 may be coupled to container pin 803. In some embodiments, container pin 803 supports container pin spring 804, which wraps around container pin 803. In some embodiments, container pin spring 804 biases container pedal 808 to ensure that container pedal 808, returns to the starting un-depressed position.

Figure 9B:
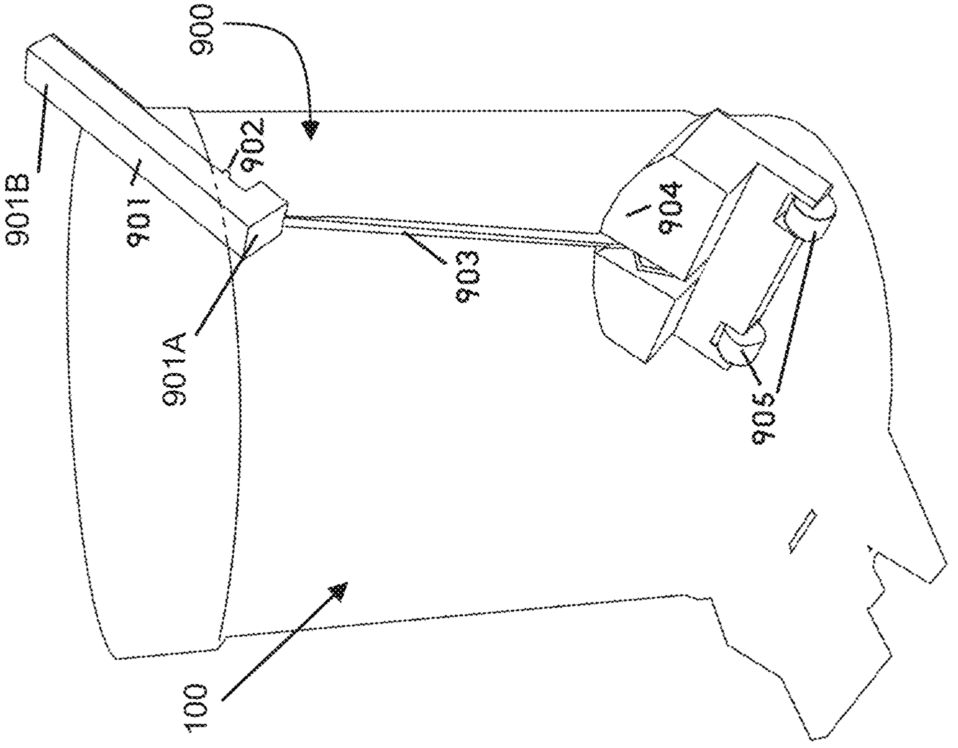
FIGS. 9A and 9B depict an example of a lever and wheel mechanism, in accordance with one or more embodiments.
Figure 9A:
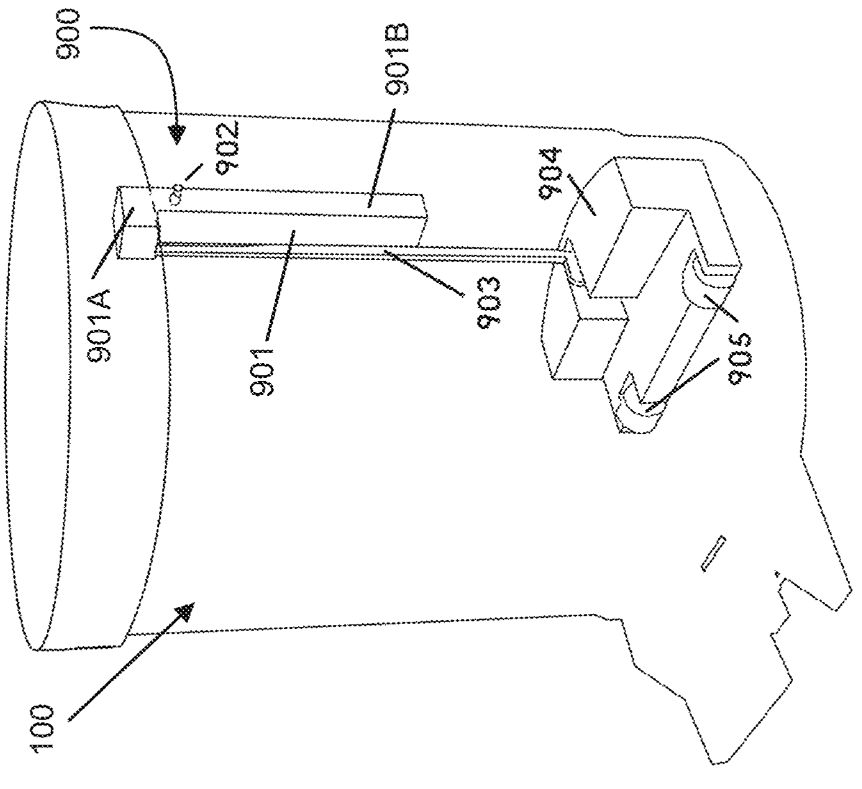

FIGS. 9A and 9B depict an example of a lever and wheel mechanism 900, in accordance with one or more embodiments. In some embodiments, container 100 may include a lever and wheel mechanism 900 to enable convenient mobility of container 100. As depicted in FIGS. 9A and 9B, lever and wheel mechanism 900 includes handle 901 coupled to handle pivot rail 902 and handle rod 903, which is coupled to wheel base 904 and wheels 905. Container 100 is outlined in FIGS. 9A and 9B in order to depict placement of lever and wheel mechanism 900. FIG. 9A depicts mechanism 900 in a flat resting position. In the flat resting position, wheels 905 are even with the bottom wheel base 904 and/or do not contact the ground, such that motion of the wheels is restricted and/or prevented. FIG. 9B depicts 900 in a mobile position.

As shown, handle 901 comprises a head portion 901A and a tail portion 901B. In some embodiments, handle 901 may be operated by pulling tail portion 901B of handle 901 upward, such that handle 901 pivots around handle pivot rail 902, as depicted in FIG. 9B. Such movement pushes head portion 901A to pivot downward pushing handle rod 903 downward. This downward motion in turn causes wheel base 904 to tip downward allowing wheels 905 to contact the ground in the mobile position. In the mobile position, the container may be pushed and/or pulled via wheels 905.

In some embodiments, handle 901, handle pivot rail 902, and handle rod 903 may be situated within spine 302. In some embodiments, wheel base 904 and wheels 905 may be situated within base 108.

Figure 10:
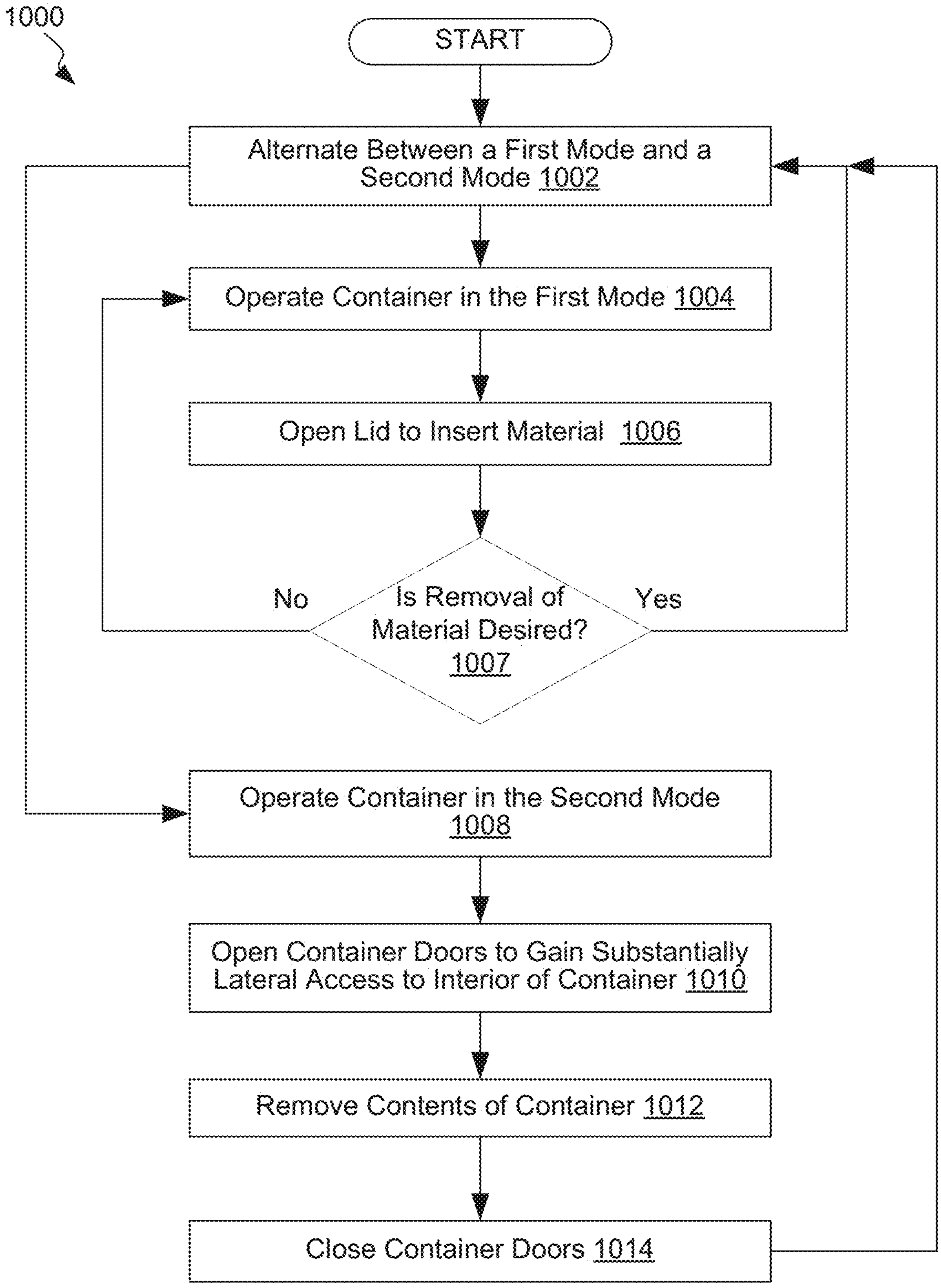
FIG. 10 illustrates a process flowchart corresponding to an example method for operating an embodiment of a container, in accordance with one or more embodiments.

FIG. 10 illustrates a process flowchart corresponding to an example method 1000 for operating an embodiment of a container, such as container 100, in accordance with one or more embodiments. As previously described, a container to be operated in a manner consistent with method 1000, such as container 100, may comprise a cover, a base, and a body, which includes one or more spine structures and one or more door panels.

At step 1002, a first mode and a second mode are alternated between. In some embodiments, the first mode and the second mode operate concurrently and can be accessed separately via different mechanisms. In various embodiments, in the first mode, a user may access a first mechanism to open a lid of the cover to access an opening to insert material, while in the second mode, the user may access a second mechanism to open the one or more door panels, wherein the opening of one or more door panels provides substantially lateral access to the interior of the container.

In some embodiments, alternating between the first mode and the second mode includes activating a switch mechanism, such as switch 110. As previously described, the same pedal, such as pedal 112, may operate the opening of the lid 102 and the unlocking of door panels 105 and 106, and upper cover 104. In the first mode of such embodiments, the pedal 112 only activates a first mechanism to open the lid 102 for insertion of material. In the second mode of such embodiments, the pedal activates a second mechanism which releases a latch mechanism to release the door panels open to provide substantially lateral access to the interior of the container 100.

In other embodiments, container 100 may include a pedal, such as pedal which includes a first pedal mechanism, such as lid pedal 809, and a second pedal mechanism, such as container pedal 808. The first pedal mechanism corresponds to the first mechanism and the second pedal corresponds to the second mechanism. As previously described, alternating between the first mode and the second mode may include lifting lid pedal 809 upwards to expose and access container pedal 808 and/or lowering lid pedal 809 to cover container pedal 808.

At step 1004, the first mode has been selected and the container is operated in the first mode. In the first mode, activation of the pedal may cause the floor rod to mechanically open the lid. For example, depression of pedal 112 and/or lid pedal 809 may cause floor rod 222 to rotate and force spine rod 702 to open lid 102. Thus, the lid of the container may be opened in this manner at step 1006 to reveal an opening in order to insert material into the container.

At 1007, it is determined as to whether removal of material from the container is desired. If removal of material is not desired, method 1000 returns to step 1004 to continue operation of container in the first mode. However, if removal of material is desired, method 1000 returns to step 1002 to switch to the second mode.

Once the second mode has been selected, the container may be operated in the second mode at step 1008. In some embodiments, cover 104 and door panels 105 and 106 may be secured in a closed position by the latch mechanism. As previously described and depicted in the aforementioned Figures, in various embodiments, the latch mechanism comprises a door rod coupled to a first door panel in a vertical orientation. The door rod may move upward and downward on a vertical axis. The latch mechanism also includes one or more door hooks coupled to the door rod. The latch mechanism may also include one or more door pins coupled to a second door panel, wherein the one or more door hooks attaches to the one or more corresponding door pins to secure the first door panel 105 and the second door panel 106 in a closed position. Finally, the latch mechanism may further include a cover hook coupled to the first door panel 105, wherein the cover hook attaches to a cover pin of the cover to secure the upper cover in a closed position.

At step 1010, the container doors may be opened to gain substantially lateral access to the interior of the container. As previously described, container 100 may include a pedal coupled to the base, a floor rod coupled to the pedal, a connector pin coupled to the pedal, and a vertical pin coupled to the switch mechanism. Such vertical pin may move upward and downward on a vertical axis. In the second mode, activation of the pedal, such as pedal 112, may cause the connector pin to engage the vertical pin in an upward vertical motion to engage the door rod in an upward vertical motion. The upward motion of the door rod may then cause one or more door hooks to detach from the one or more corresponding door pins to allow the first door panel and the second door panel to open. Additionally, and/or alternatively, the upward motion of the door rod may also cause the cover hook to detach from the cover pin to allow the upper cover to open.

In another embodiment, operation of the container in the second mode may comprise activation of a second pedal mechanism, such as container pedal 809. As previously described, in embodiments with a two pedal system, the switch may not be included and activation of container pedal 809 may engage the door rod and cause upward motion of the door rod without the vertical pin.

Thus, the doors of the container may be opened in this manner in order to allow greater access to the interior in order to remove the contents of the container as step 1012. Once the contents of the container have been removed, the container doors may be closed at step 1014. In some embodiments, closing the container doors 1014 may require subsequent activation of the pedal or other mechanism in order to lift the door hooks as previously described. In other embodiments, the configuration of door hooks may automatically lock together by sliding into place as the container doors are closed. Method 1000 may then return to step 1002 to alternate back to the first mode for continued operation.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A container comprising:

a body including a first mechanism and a second mechanism for accessing an inside of the container, wherein the first mechanism allows access to an interior of the container through a top of the container;

wherein the second mechanism allows substantially lateral access to the interior of the container, wherein the container operates in a first mode and a second mode, wherein in the first mode, the access to the second mechanism is locked, and wherein in the second mode, access to the second mechanism is unlocked.

2. The container of claim 1, wherein the first mechanism includes a lid that is coupled to the body by a hinge mechanism.

3. The container of claim 2, wherein the lid opens and shuts via an automatic sensor mechanism to allow or prevent access into the interior of the container through the top of the container.

4. The container of claim 1, wherein the second mechanism includes a door panel that is coupled to the body by a hinge mechanism.

5. The container of claim 4, wherein the door panel opens and shuts via an automatic sensor mechanism in the second mode to allow or prevent access into the interior of the container through the top of the container.

6. The container of claim 4, wherein the door panel opens and shuts via a button mechanism in the second mode to allow or prevent access into the interior of the container through the top of the container.

7. The container of claim 4, wherein the door panel opens and shuts via a latch mechanism in the second mode to allow or prevent access into the interior of the container through the top of the container.

8. The container of claim 1, further including a mechanism to hold a bag.

9. The container of claim 8, wherein the container is configured such that objects can be inserted into the bag in the first mode.

10. The container of claim 8, wherein the container is configured such that the bag, and any objects contained in the bag, can be laterally removed from the container in the second mode.

11. A trash bin comprising:

a body including a first mechanism and a second mechanism for accessing an inside of the trash bin, wherein the first mechanism allows access to an interior of the trash bin through a top of the trash bin;

wherein the second mechanism allows substantially lateral access to the interior of the trash bin, wherein the trash bin operates in a first mode and a second mode, wherein in the first mode, the access to the second mechanism is locked, and wherein in the second mode, access to the second mechanism is unlocked.

12. The trash bin of claim 11, wherein the first mechanism includes a lid that is coupled to the body by a hinge mechanism.

13. The trash bin of claim 12, wherein the lid opens and shuts via an automatic sensor mechanism to allow or prevent access into the interior of the trash bin through the top of the trash bin.

14. The trash bin of claim 11, wherein the second mechanism includes a door panel that is coupled to the body by a hinge mechanism.

15. The trash bin of claim 14, wherein the door panel opens and shuts via an automatic sensor mechanism in the second mode to allow or prevent access into the interior of the trash bin through the top of the trash bin.

16. The trash bin of claim 14, wherein the door panel opens and shuts via a button mechanism in the second mode to allow or prevent access into the interior of the trash bin through the top of the trash bin.

17. The trash bin of claim 14, wherein the door panel opens and shuts via a latch mechanism in the second mode to allow or prevent access into the interior of the trash bin through the top of the trash bin.

18. The trash bin of claim 11, further including a mechanism to hold a bag.

19. The trash bin of claim 18, wherein the trash bin is configured such that objects can be inserted into the bag in the first mode.

20. The trash bin of claim 18, wherein the trash bin is configured such that the bag, and any objects contained in the bag, can be laterally removed from the trash bin in the second mode.

* * * * *